United States Patent
Isogai

(10) Patent No.: US 7,636,451 B2
(45) Date of Patent: Dec. 22, 2009

(54) DIGITAL WATERMARK EMBEDDING APPARATUS AND METHOD, AND DIGITAL WATERMARK DETECTION APPARATUS AND METHOD

(75) Inventor: Taichi Isogai, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 677 days.

(21) Appl. No.: 11/469,499

(22) Filed: Sep. 1, 2006

(65) Prior Publication Data

US 2007/0071282 A1   Mar. 29, 2007

(30) Foreign Application Priority Data

Sep. 9, 2005  (JP)  ............................. 2005-262578
Jul. 13, 2006  (JP)  ............................. 2006-193102

(51) Int. Cl.
*G06K 9/00* (2006.01)
*H04L 9/32* (2006.01)

(52) U.S. Cl. ...................................... 382/100; 713/176
(58) Field of Classification Search ................. 382/100, 382/232; 380/51, 54, 201, 210, 252, 287; 370/522–529; 283/72, 74–81, 85, 93, 113, 283/901, 902; 713/176, 179; 358/3.28; 348/461, 348/463; 725/9, 20, 22
See application file for complete search history.

(56) References Cited

U.S. PATENT DOCUMENTS 6,693,965 B1 *  2/2004  Inoue et al. ............ 375/240.19
6,751,337 B2 *  6/2004  Tewfik et al. ................ 382/100
7,047,412 B2 *  5/2006  Echizen et al. .............. 713/176

FOREIGN PATENT DOCUMENTS

JP    2003-174631    6/2003

* cited by examiner

Primary Examiner—Abolfazl Tabatabai
(74) Attorney, Agent, or Firm—Turocy & Watson, LLP

(57) ABSTRACT

A digital watermark embedding apparatus includes a watermark providing unit configured to provide a digital watermark, an obtaining unit configured to obtain an image component from a plurality of frames of video contents based on image data of the plurality of frames, the image component affecting an error occurring at a time of detecting an image pattern of the digital watermark, a generating unit configured to generate a first image pattern and a second image pattern in converse relation, using the image pattern of the digital watermark and the image component, and an overlapping unit configured to overlap the first image pattern and the second image pattern the frames on the frames, respectively, to eliminate or reduce the image component.

12 Claims, 10 Drawing Sheets

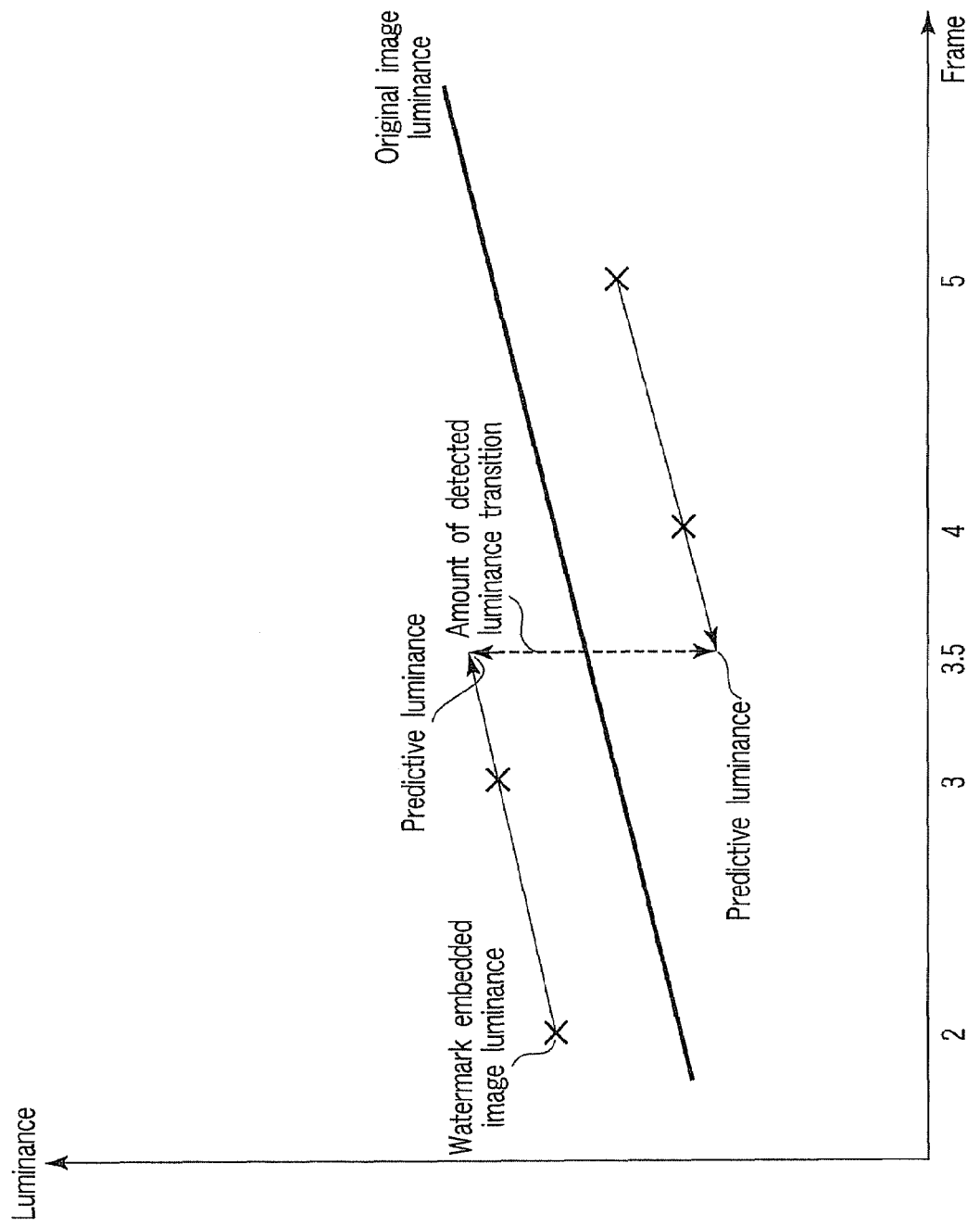
F I G. 11

DIGITAL WATERMARK EMBEDDING APPARATUS AND METHOD, AND DIGITAL WATERMARK DETECTION APPARATUS AND METHOD

CROSS-REFERENCE TO RELATED APPLICATIONS

This application is based upon and claims the benefit of priority from prior Japanese Patent Applications No. 2005-262578, filed Sep. 9, 2005; and No. 2006-193102, filed Jul. 13, 2006, the entire contents of both of which are incorporated herein by reference.

BACKGROUND OF THE INVENTION

1. Field of the Invention

The present invention relates to a digital watermark embedding apparatus and method to embed a digital watermark in contents, and a digital watermark detection apparatus and method to detect a digital watermark from contents.

2. Description of the Related Art

In recent years, fields handling digital contents increase due to development of a computer and a network. The digital contents have features capable of making exactly the same contents as original contents with a very low cost. For this reason, an anti-illegal copy measure of a digital copyrighted work becomes indispensable.

Digital Watermarks wherein additional information is embedded in digital contents in the degree that a person cannot find the additional information are broadly discussed and developed as one of an anti-illegal copy measure for allowing insistence of a copyright broadly.

There is a digital watermark technology for embedding digital watermark in a difference between frames (refer to JP-A 2003-174631(KOKAI), for example). In this technology, a digital watermark is embedded in contents by overlapping a pattern of the first watermark on the frame of the frame number f, and a pattern of the second watermark generated by inverting the polarity of the pattern of the first watermark in the frame of the f+1 frame number. The digital watermark is detected by obtaining a difference between the frame of the f frame number and the frame of the f+1 frame number.

However, in the case that the difference between the frames before embedding the digital watermark is large (for example, in the case of the scene with large movement in video contents), there is a problem that a very large noise component is detected along with the watermark component, resulting in causing false detection.

In the conventional method for embedding a digital watermark by overlapping watermark patterns reversed in polarity to each other on two frames, respectively, and detecting the digital watermark by obtaining a difference between the frames, when the difference between the frames is large, it sometimes fails to detect a watermark pattern exactly.

BRIEF SUMMARY OF THE INVENTION

An aspect of the present invention provides a digital watermark embedding apparatus for embedding an image patterns as a digital watermark in each of a plurality of frames of video contents, comprising: a watermark providing unit configured to provide a digital watermark; an obtaining unit configured to obtain an image component from a plurality of frames of video contents based on image data of the plurality of frames, the image component affecting an error occurring at a time of detecting an image pattern of the digital watermark; a generating unit configured to generate a first image pattern and a second image pattern in converse relation, using the image pattern of the digital watermark and the image component; and an overlapping unit configured to overlap the first image pattern and the second image pattern the frames on the frames, respectively, to eliminate or reduce the image component.

BRIEF DESCRIPTION OF THE SEVERAL VIEWS OF THE DRAWINGS

FIG. 11 is a diagram for explaining detection of a watermark pattern.

DETAILED DESCRIPTION OF THE INVENTION

There will now be described embodiments of the present invention in conjunction with accompanying drawings.

In symbols used in the description, WM indicates a watermark pattern to be embedded in an object image. In the present embodiment, it is assumed that the watermark pattern is image data for one frame. The watermark pattern is referred to $I_{WM}$ too.

Figure 3:
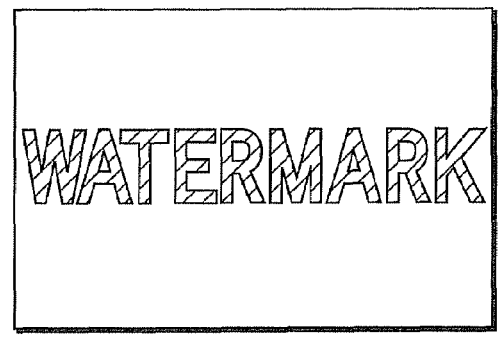
FIG. 3 is a diagram of a watermark pattern.

A watermark pattern (watermark image pattern) to be embedded in an image is shown in FIG. 3. FIG. 3 shows a pattern wherein the pixel value of the part indicated by hatched lines is "+1", and the pixel value of the remaining part is "−1". The reversed pattern of this pattern is a pattern wherein the pixel value of the part indicated by hatched lines is "−1", and the pixel value of the remaining part is "+1". The pixel value of a part of a letter may be "−1", and the pixel value of the remaining part may be "+1".

In FIG. 3, how to obtain the pixel value may be another method. For example, a pattern wherein the pixel value of the hatched part is "+1", and the pixel value of the remaining part is "0" is available. In this case, the reversed pattern of this pattern is a pattern wherein the pixel value of the hatched part is "−1" and the remaining part is "0".

I and I to which a code of English letter, etc. is attached represent image data. In the present embodiment, it is assumed that the image data is image data for one frame.

Ii which the number i is attached to I represents an image identified by the number i in particular. In the present embodiment, the number i for identifying the image is assumed to be the frame number in the moving image. The present embodiment will be described with the assumption that consecutive numbers starting from 1 are attached to continuous frames of the moving image, sequentially.

Ii which a prime is attached to I (in other words, $I_i'$, $I_i''$, $I_i'''$) represents in particular an image subjected to a process for embedding a watermark pattern therein (including an image in the middle of processing).

In a calculation equation to use in the present embodiment, addition of two images or subtraction between two images is assumed to be done every pixel (add values of corresponding pixels or subtract them from each other). It is assumed that numerical multiplication to the image is done for each pixel (in other words the same digit value is multiplied by the value of each pixel).

−I with respect to a certain image I represents a reversed image of the image I. An image $I_1+(-I_2)$ is obtained by overlapping a reversed image of an image $I_2$ on an image $I_1$. Actually, it may be generated by adding a reversed image of the image $I_2$ to the image $I_1$ or by subtracting the image $I_2$ from the image $I_1$.

$I_D$ represents a difference picture between two images (for example, $I_D=I_1-I_2$). f(x) represents an image provided by subjecting an image x to signal processing (given filtering in the present embodiment). g(x) is similar to the above.

There will be explained a conventional digital watermark using a difference between frames.

In the conventional digital watermark embedding method, a watermark is embedded in each of the images $I_1$ and $I_2$, for example. As indicated by the following equation, an image obtained by overlapping (adding) a watermark pattern "WM" to the image $I_1$ is assumed to be a watermark embedded image $I_1'''$. An image obtained by overlapping (adding) a watermark pattern "−WM" to the image $I_2$ (image obtained by subtracting a watermark pattern WM from the image $I_2$) is assumed to be a watermark embedded image $I_2'''$.

$$I_1'''=I_1+WM$$

$$I_2'''=I_2+(-WM)$$

In the conventional digital watermark detection method, when a watermark is detected from each of the images $I_1$ and $I_2$, a detected watermark pattern WM' is obtained from a difference between the watermark embedded images $I_1'''$ and $I_2'''$ as indicated by the following equation:

$$WM'=I_1'''-I_2'''=I_1-I_2+2WM=I_D+2WM \approx 2WM \text{ (where } |2WM|>>|I_D|)$$

In such a conventional method, when $I_D$ cannot be ignored with respect to 2WM, an error is included in a detection result. A detection error occurs according to conditions. It is necessary to suppress WM to a small value of some extend for picture quality of contents to be maintained. On the other hand, since conventionally $I_D$ is not small in video contents, the above conventional digital watermark can be used in the moving image.

In each embodiment described hereinafter, there is described mainly a case to overlap on an object image a watermark pattern modified based on the feature quantity of the object image (a watermark pattern overlapping an image component based on the feature quantity of the object image). However, it may be a case that the object image is modified based on the feature quantity of the object image (a case that an image component based on the feature quantity of the object image is overlapped on the object image, and then the watermark pattern is overlapped on the object image, or a case that the watermark pattern is overlapped on the object image, and then an image component based on the feature quantity of the object image is overlapped on the object image).

In each embodiment, when a watermark pattern modified based on the feature quantity of the object image is overlapped on the object image, the watermark pattern actually overlapped on each of the object images (for example, images $I_1$ and $I_2$ in the first embodiment) is not the watermark pattern WM, but a watermark pattern obtained by modifying this (for example, Wp or Wn of the first embodiment). Accordingly, the modified watermark pattern actually overlapped on the object image is referred to as an "embedding pattern" for the purpose of discriminating from the original watermark pattern.

FIRST EMBODIMENT

In the first embodiment, when a digital watermark is embedded in each of two images (for example, $I_1$ and $I_2$) using a difference between frames, the watermark embedding is done as follows. In other words, instead of overlapping the watermark patterns WM on these images, patterns obtained by modifying the watermark patterns WM using the features of these images (i.e., difference picture $I_D$) are embedded on the images. Alternatively, the watermark patterns WM are embedded on the images in tandem with modifying the object image using the features of the images. According to the above watermark embedding method, at the time of watermark detection, a detection error due to the feature of the image does not occur regardless of magnitude relation between WM and $I_D$.

There will be explained algorithm of the digital watermark of the present embodiment hereinafter. The digital watermark embedding method of the present embodiment will be described as an example for embedding watermarks in the images $I_1$ and $I_2$.

A difference $I_D$ ($=I_1-I_2$) between the object images $I_1$ and $I_2$ is calculated. A positive embedding pattern Wp ($=WM-I_D/2$) and a negative embedding pattern Wn ($=I_D/2-WM=-Wp$) corresponding to a reversed pattern of the positive embedding pattern Wn are produced. An image generated by overlapping the embedding pattern Wp on the image $I_1$ is assumed to be a watermark embedded image $I_1''$, and an image generated by overlapping the embedding pattern Wn on the image $I_2$ is assumed to be a watermark embedded image $I_2'$.

$$I_D=I_1-I_2 \quad (1).$$

$$Wp=(WM-I_D/2) \quad (2\text{-}1).$$

$$Wn=(I_D/2-WM) \quad (2\text{-}2).$$

$$I_1'=I_1+Wp \quad (3\text{-}1).$$

$$I_2'=I_2+Wn \quad (3\text{-}2).$$

The above calculation may be done in any order except for constrains of executing the equation (1) before the equations (2-1) and (2-2), executing the equation (2-1) before the equation (3-1) and executing the equation (2-2) before the equation (3-2).

The equations (2-1) and (2-2) can be simultaneously executed, and the equations (3-1) and (3-2) can be simultaneously executed, too. The equation (2-2) may be executed as Wn=−Wp using a calculation result of the equation (2-1). The equation (2-1) may be executed as Wp=−Wn using a calculation result of the equation (2-2). For example, instead of adding the embedding pattern Wn to the image $I_2$, the embedding pattern Wn may be subtracted from the image $I_2$ (in this case it is not necessary to obtain the embedding pattern Wn).

The procedure of generation of difference image→generation of embedding pattern→overlapping of the embedding pattern on the object image may be replaced with a procedure based on overlapping the embedding pattern on the object image every component as follows:

$$I_D=I_1-I_2(1_2-1)I_1''=I_1+(-I_D/2) \qquad (11).$$

$$I_2''=I_2+(I_D/2) \qquad (12\text{-}2).$$

$$I_1'=I_1''+WM \qquad (13\text{-}1).$$

$$I_2'=I_2''+(-WM) \qquad (13\text{-}2).$$

In this procedure, various kinds of variations as discussed above are possible.

The above procedures may be combined as follows:

$$I_D=I_1-I_2 \qquad (1).$$

$$Wp=(WM-I_D/2) \qquad (2\text{-}1).$$

$$I_1'=I_1+Wp \qquad (3\text{-}1).$$

$$I_2''=I_2+(I_D/2) \qquad (12\text{-}2).$$

$$I_2'=I_2''+(-WM) \qquad (13\text{-}2).$$

Various kinds of procedures (these procedures can be further modified to various kinds of variations) as well as the above-mentioned procedure may be applied.

Even if what procedure is taken, the watermark embedded images $I_1'$ and $I_2'$ with respect to the object images $I_1$ and $I_2$ are represented as follows:

$$I_1'=I_1+(WM-I_D/2)I_2'=I_2+(I_D/2-WM)$$

The digital watermark detection method of the present embodiment is described about a case for detecting a watermark from a difference between the images $I_1$ and $I_2$. A detection watermark pattern DWM is obtained from a difference between the watermark embedded images $I_1'$ and $I_2'$ as shown in the following procedure.

It is understood from DWM=$I_1'-I_2'=I_1-I_2-I_D+2WM=I_D-I_D+2WM=2WM$ that the detection watermark pattern DWM is calculated by multiplying the original watermark pattern WM by 2.

If necessary, the original watermark pattern WM may be reproduced as the detection watermark pattern DWN by multiplying the difference between the images $I_1'$ and $I_2'$ by ½.

In such a way, the digital watermark method of the present embodiment can extract the watermark pattern without producing a detection error due to the feature of image at the time of watermark detection, regardless of magnitude relation between 2WM and $I_D$. Accordingly, this digital watermark can use for the video contents, etc., whose $I_D$ is not small conventionally.

The digital watermark embedding apparatus of the present embodiment comprises a frame memory 11, a feature extractor 12, an embedding pattern generator 14, a watermark overlapping unit 15, and a controller 16.

The frame memory 11 comprises a buffer to store temporally data of a frame to be processed (or object frame) among the moving image in which a watermark pattern should be embedded. In the present embodiment, the frame memory 11 stores data of the image $I_f$ of the frame number f corresponding to the number f indicated by frame number information given by the controller 16, for example.

The feature quantity extractor 12 extracts a given feature quantity from the moving image to be processed for embedding a watermark pattern therein. In the present embodiment, a difference image $I_D$ (=$I_f-I_{f-1}$) between the image If of the frame number f and the image $I_{f-1}$ of the frame number f−1 is obtained, the frame number f corresponding to the number f indicated by the frame number information given by the controller 16.

The embedding pattern generator 14 generates embedding patterns to be overlapped on object images (a set of plural frames) respectively. In the present embodiment, the embedding patterns each are generated based on, for example, the image $I_f$ of the frame number f indicated by the frame number information given by the controller 16, the feature quantity (difference picture $I_D$) extracted from patterns Wp, Wn to be embedded in the image $I_{f-1}$ of the frame number f−1 by the feature quantity extractor 12, and the watermark pattern WM given by the controller 16.

The watermark overlapping unit 15 overlaps the embedding patterns on the object images (a set of plural frames) respectively. In the present embodiment, the embedding patterns Wp and Wn generated by the embedding pattern generator 14 are embedded in the images $I_f$ and $I_{f-1}$ of the frame number f indicated by the frame number information given by the controller 16, respectively. The controller 16 controls the whole of the digital watermark embedding apparatus 1.

There are various kinds of variations for determining which frame of the video contents to be embedded with the watermark is subjected to a watermark embedding process. For example, all of the frames may be used as the object image, or one or more set of frames that are determined beforehand by the frame numbers, etc., may be used. For example, the object frame may be designated from the outside.

There are various kinds of variations for designating the watermark pattern. For example, the same watermark pattern may be always embedded, or the watermark pattern may be designated from the outside. For example, one watermark pattern may be embedded in common in all frames of one moving image, and a different watermark pattern may be embedded in one or more of the frames according to frame condition.

The above each unit may have a buffer storing the image data necessary for the process, and the necessary image data may be stored in the frame memory 11 or other buffers in a mass.

Figure 2:
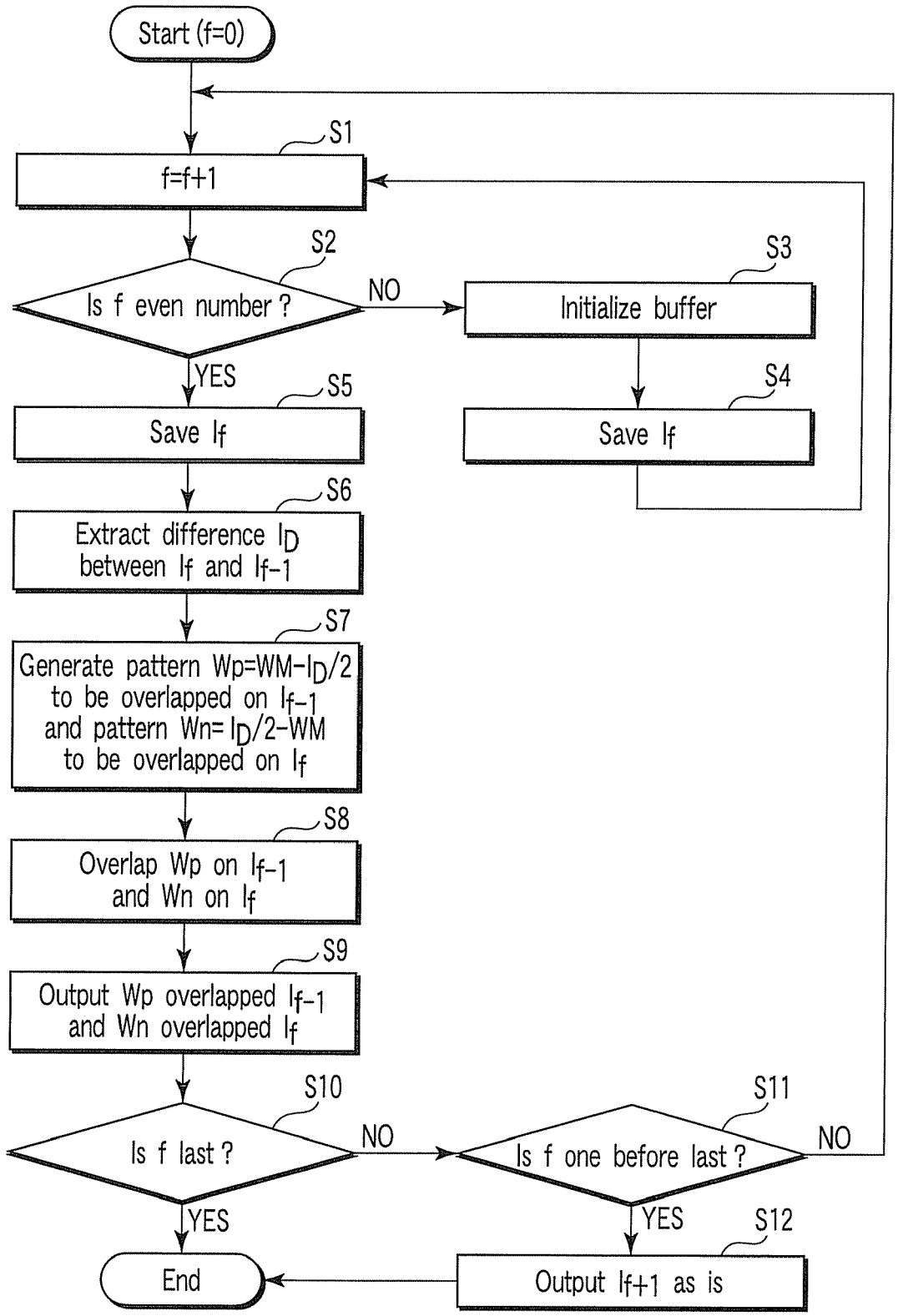
FIG. 2 is a flow chart indicating a procedure of a digital watermark embedding process in the embodiment.

In a procedure of the digital watermark embedding process of the present embodiment shown in FIG. 2, all frames of the object moving image are to be embedded with the watermark. However, if the number of frames is an odd number, the last frame is not processed.

This procedure uses a procedure of (1) to (3-2).

The process is started for the frame number f=0, and the following process is repeatedly done till YES is determined in step S10 or step S11.

At first, 1 is added to f (step S1), and it is determined whether f is an odd number (step S2). If the determination is NO, the buffer is initialized (step S3) and then the frame $I_f$ is input to the frame memory 11 and saved therein (step S4). Thereafter, the process is returned to step S1 to add 1 to f.

If the determination in step S2 is YES, that is, f is an even number, the frame $I_f$ is input to the frame memory 11 and saved therein (step S5). At this point in the process, the frame $I_f$ and the frame $I_{f-1}$ directly before the frame If are stored in the frame memory 11.

In step S6, the difference $I_D$ (=$I_f-I_{f-1}$) between two frames $I_f$ and $I_{f-1}$ stored in the frame memory 11 is obtained by the feature extractor 12. In step S7, a pattern Wp=WM−I_D/2 to be overlapped on the frame I_{f−1} and a pattern Wn=I_D/2−WM to be overlapped on the frame If are generated by the embedding pattern generator 14.

The patterns Wp and Wn are overlapped on the frames I_{f−1} and I_f by the watermark overlapping unit 15, respectively (step S8). The frame I_{f−1} overlapped with the pattern Wp and the frame I_f overlapped with the pattern Wn are output from the watermark overlapping unit 15 (step S9).

In step S10, it is determined whether the frame f is last. If the determination is YES, that is, an unprocessed frame is nothing, this process is finished. If only one unprocessed frame is left, that is, the determination in step S10 is NO, it is determined whether the frame I_f is a frame I_{f+1} directly before the last frame (step S11). If the determination is YES, the frame I_{f+1} is output as-is (step S12), and this process is finished. When the determination in step S11 is NO, that is, two or more unprocessed frames remain, the process comes back to step S1 to repeat the same process.

The procedure of FIG. 2 uses the procedure of (1) to (3-2), but may use the procedure of (11) to (13-2). In this case, in the procedure of FIG. 2, for example, step S7 has only to be changed to "a process of overlapping the pattern −I_D/2 on the frame I_{f−1} and the pattern I_D/2 on the frame I_f (i.e., a step of I_{f−1}=I_{f−1}+(−I_D/2) and I_f=I_f+I_D/2), and step S8 has only to be changed to a process of overlapping WM on the frame I_{f−1} and −WM on the frame I_f (i.e., a process of I_{f−1}=I_{f−1}+WM and I_f=I_f+(−WM)).

Figure 4:
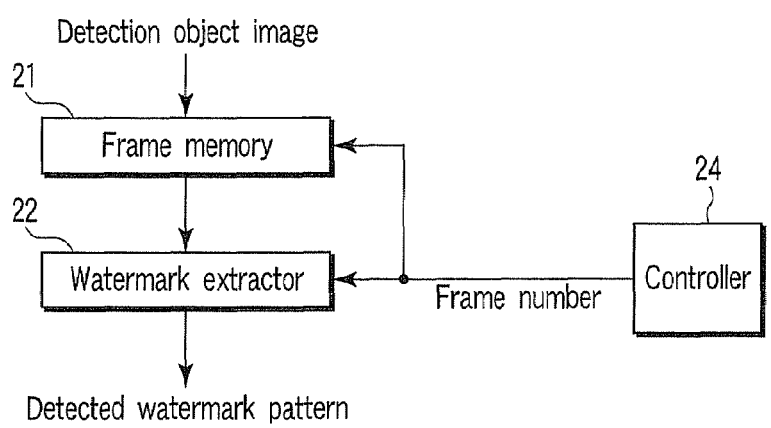
FIG. 4 is a schematic block diagram of a digital watermark detection apparatus according to the embodiment.

The digital watermark detection apparatus shown in FIG. 4 comprises a frame memory 21, a watermark extractor 22 and a controller 24. The frame memory 21 stores temporarily data of a to-be-processed frame (object frame) among the moving image from which a watermark pattern should be detected. In the present embodiment, the frame memory 21 stores data of the frame I_f of the frame number f indicated by the frame number information given by the controller 24.

The watermark extractor 22 extracts the detection watermark pattern DWM using the data of the object frame. In the present embodiment, a detection watermark pattern DWM is assumed to be a difference between the frame I_f of frame number f indicated by the frame number information given by the controller 24 and the frame I_{f−1} of the frame number f−1 (or a value obtained by multiplying the difference by ½).

The controller 24 controls the whole of the digital watermark embedding apparatus 1. There are various variations for using any frame of the video contents to be tried to be subjected to watermark detection as an object to be processed for watermark detection like the watermark embedding previously described.

The above each unit may have a buffer saving the image data necessary for the process. The image data may be stored in the frame memory 21 or another buffer in a mass.

Figure 5:
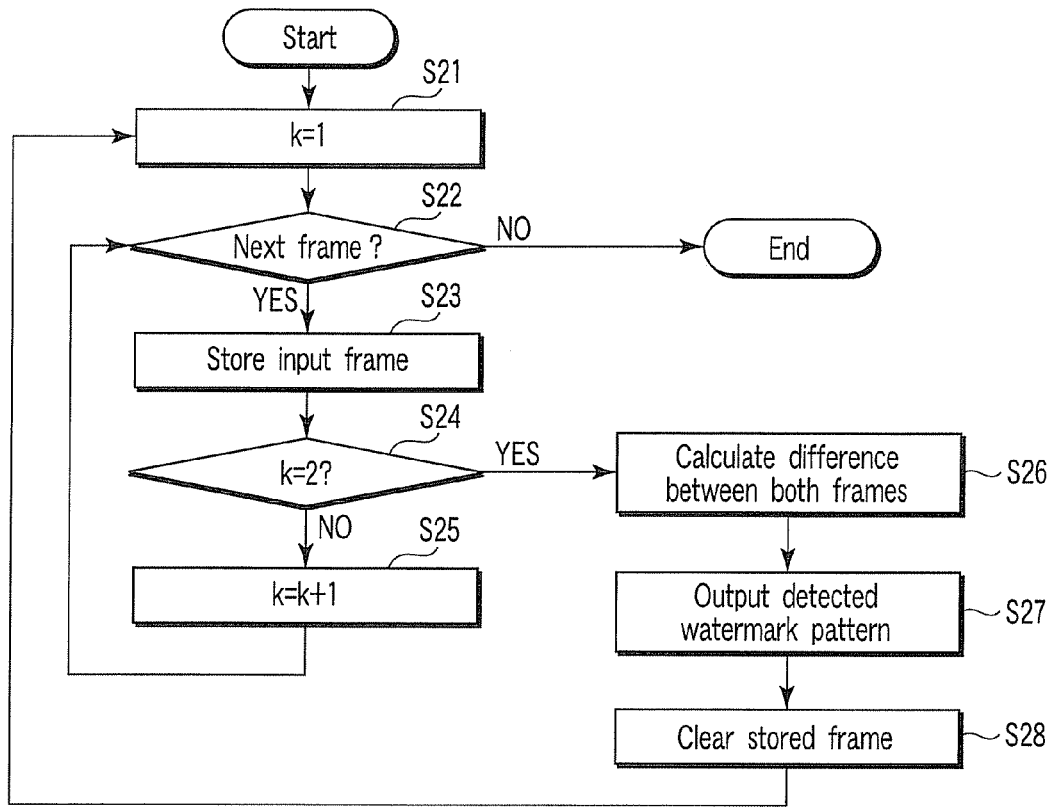
FIG. 5 is a flow chart indicating a procedure of a digital watermark detection process in the embodiment.

In a procedure of the digital watermark detection process in the present embodiment shown in FIG. 5, all frames of the moving image as an object is assumed to be an object to be detected (however, if the number of frame is an odd number, the last frame is unprocessed). In FIG. 5, description about the frame number is omitted.

The following process is done repeatedly till NO is determined in step S22. k=1 is set (step S21). It confirms whether there is a next frame (a top frame of frames which are not input or stored) (step S22). When there is the next frame, the next frame is input and saved to the frame memory 21 (step S23).

If "k=2" is false, 1 is added to k (steps S24 and S25) and the process returns to step S22. The process of steps S22 and 823 is done. If "k=2" is truth in step S2, the process advances to step S26. At this point in the process, the frame I_f and the frame I_{f−1} directly before the frame I_f are stored in the frame memory 21.

In step S26, a difference between the frame I_f of the frame number f and the frame I_{f−1} of the frame number f−1 or a value obtained by multiplying the difference by ½ is calculated in the watermark extractor 22. The difference or the value obtained by multiplying this difference by ½ is output as the detection watermark pattern DWM (step S27).

The stored frame is cleared (step S28), and the process returns to step S21 to repeat the similar process. If there is not a next frame in S22, this process is finished. A method of calculating simply a difference between frames is used as a method for extracting a component adversely affecting the watermark. However, this method has some variations. For example, in the case that a watermark pattern is embedded in a positive direction (a value of pixel is embedded in a+direction), if a difference component of images is in a positive direction (a value of pixel is in a+direction), it does not adversely affect the watermark. If the component not adversely affecting the watermark is excluded in advance from an object to be eliminated, influence to a picture quality can be further suppressed.

SECOND EMBODIMENT

The second embodiment performs signal processing on the extracted feature quantity when executing watermark embedding in order to suppress the influence of feature quantity (difference image I_D Of the first embodiment) on the picture quality of contents and prevent the picture from being deteriorated.

In the second embodiment, like reference numerals are used to designate like structural elements corresponding to those like in the first embodiment and any further explanation is omitted for brevity's sake. There will be described points different from the first embodiment.

The digital watermark embedding method of the present embodiment will be described as an example of embedding watermarks in the images I_1 and I_2. The difference I_D (=I_1−I_2) of the watermark embedding object images I_1 and I_2 is calculated. A processed difference f(I_D) is obtained by subjecting the difference I_D to signal processing f(x) (for example, filtering the difference I_D with a filter such as a low pass filter). The embedding pattern Wp (=WM−f(I_D)/2) of a positive direction and the embedding pattern Wn (=f(I_D)/2−WM=−Wp) of a negative direction, that is, a reversed pattern of the pattern Wp are obtained. The image generated by overlapping (adding) the embedding pattern Wp to the image I_1 is assumed to be a watermark embedded image I_1', and the image generated by adding the embedding pattern Wn to the image I_2 is assumed to be a watermark embedded image I_2'.

$$I_D = I_1 - I_2 \quad (21\text{-}1):$$

$$f(I_D) \quad (21\text{-}1:$$

$$Wp = (WM - f(I_D)/2) \quad (21\text{-}1):$$

$$Wn = (f(I_D)/2 - WM) \quad (22\text{-}2):$$

$$I_1' = I_1 + Wp \quad (23\text{-}1):$$

$$I_2' = I_2 + Wn$$

The above calculation may be done in any order except for constrains of executing the equation (21-1) before the equations (21-2), executing the equations (21-1) and (21-2) before the equation (22-1) and (22-2), executing the equation (22-1)

before the equation (23-1), and executing the equation (22-2) before the equation (23-2). The equations (22-1) and (22-2) can be simultaneously executed, and the equations (23-1) and (23-2) can be simultaneously executed, too. The equation (22-2) may be executed as Wn=−Wp using a calculation result of the equation (22-1). The equation (22-1) may be executed as Wp=−Wn using a calculation result of the equation (22-2). For example, instead of adding the embedding pattern Wn to the image $I_2$, the embedding pattern Wn may be subtracted from the image $I_2$ (in this case it is not necessary to obtain the embedding pattern Wn).

The basic procedure of generation of difference image→generation of the difference image→generation of embedding pattern→overlapping of the embedding pattern on the object image may be replaced with a procedure based on overlapping the embedding pattern on the object image every component as follows.

$$I_D = I_1 - I_2 \quad (31\text{-}1):$$

$$f(I_D) \quad (31\text{-}2):$$

$$I_1'' = I_1 + (-f(I_D)/2) \quad (32\text{-}1):$$

$$I_2'' = I_2 + (f(I_D)/2) \quad (32\text{-}2):$$

$$I_1' = I_1'' + WM \quad (33\text{-}1):$$

$$I_2' = I_2'' + (-WM) \quad (33\text{-}2):$$

The various kinds of variations are available other than above-mentioned procedures. Even if what procedure is taken, the watermark embedded images $I_1'$ and $I_2'$ corresponding to the watermark embedding object images $I_1$ and $I_2$ are represented as follows.

$$I_1' = I_1 + (WM - f(I_D)/2)$$

$$I_2' = I_2 + (f(I_D)/2 - WM)$$

The digital watermark detection method of the present embodiment will be described as an example of detecting a watermark from the images $I_1$ and $I_2$. The detection watermark pattern DWM is generated from the difference between the watermark embedded images $I_1'$ and $I_2'$ as shown by the following procedure.

It is understood that the detection watermark pattern DWM can be obtained by multiplying the original watermark pattern WM by 2 as shown by the following equation.

$$DWM = I_1' - I_2' = I_1 - I_2 - f(I_D) + 2WM = I_D - f(I_D) + 2WM$$

In the digital watermark method of the present embodiment, the detection watermark pattern is generated by $DWM = I_D - f(I_D) + 2WM$. It is understood that this is improved by $-f(I_D)$ in comparison with a detection result $(I_D + 2WM)$ of a conventional method. It is possible to detect the watermark more precisely while suppressing remarkable picture degradation by using, for example, a filter for the signal processing f(x).

If necessary, the detection watermark pattern DWM may be generated by multiplying the difference between the images $I_1'$ and $I_2'$ by ½ as shown by the following equation.

$$DWM = (I_1' - I_2')/2 = (I_1 - I_2 - f(I_D) + 2WM)/2 = (I_D - f(I_D))/2 + WM$$

Figure 1:
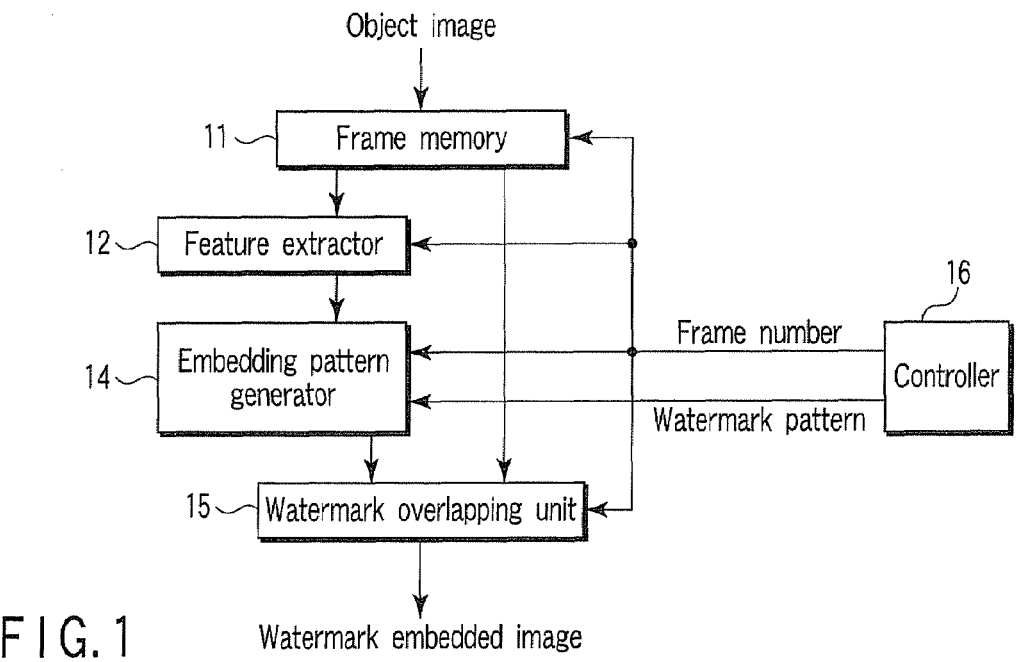
FIG. 1 is a schematic block diagram of a digital watermark embedding apparatus according to an embodiment.
Figure 6:
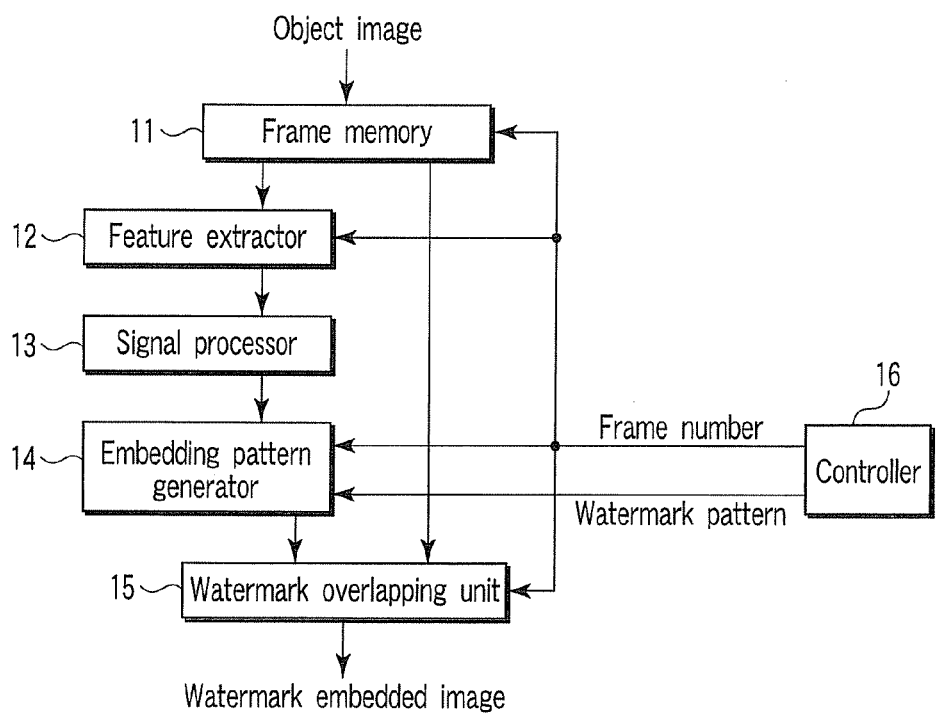
FIG. 6 is a schematic block diagram of another digital watermark embedding apparatuses concerning the embodiment.

In the digital watermark embedding apparatus related to the present embodiment shown in FIG. 6, the signal processor 13 for doing signal processing (for example, filtering the difference $I_D$ by, for example, a low pass filter) is added to the embodiment of FIG. 1. The embedding pattern generator 14 of FIG. 1 uses $I_D$ for operation, but that of FIG. 1 uses $f(I_D)$.

Figure 7:
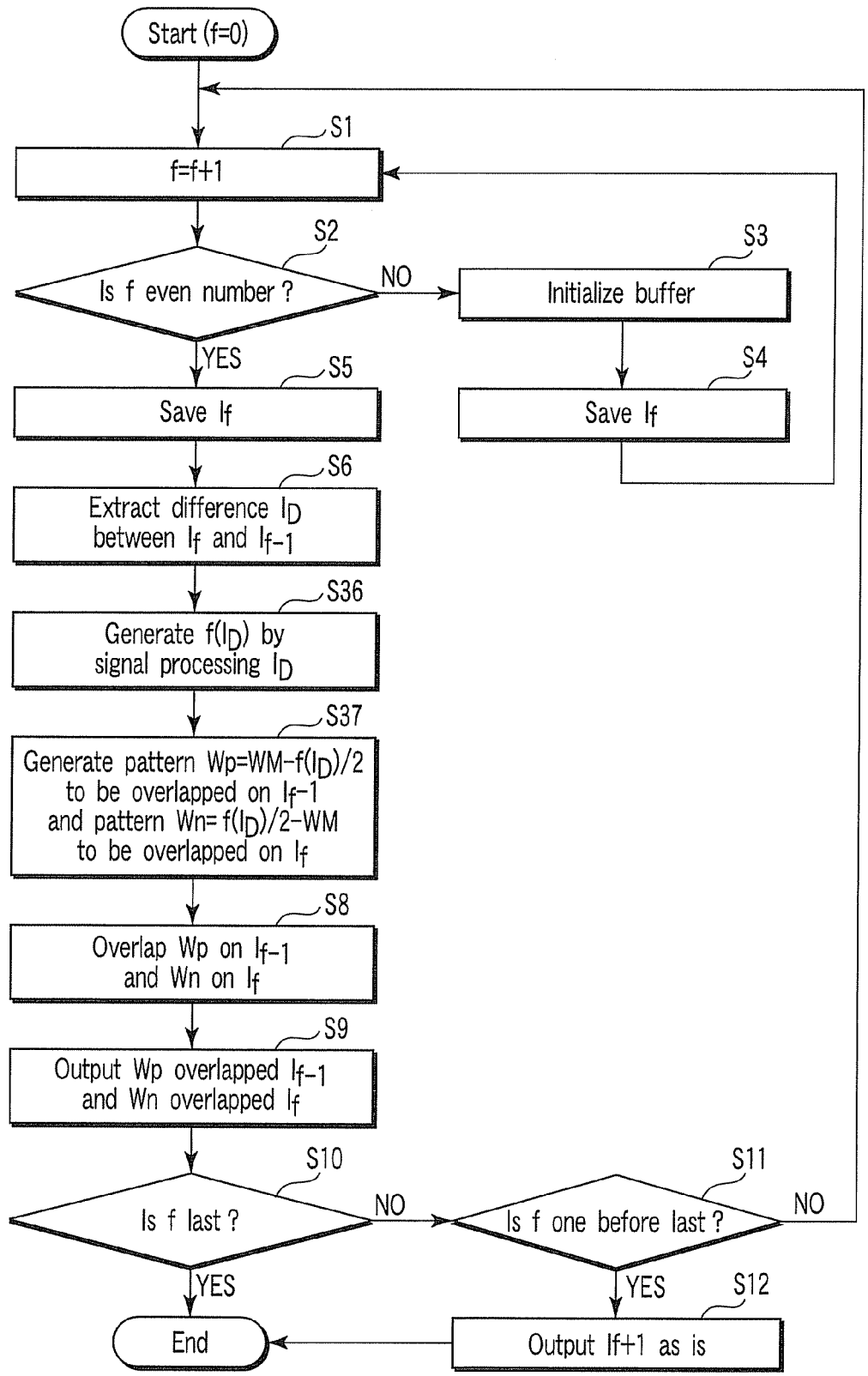
FIG. 7 is a flow chart indicating a procedure of another digital watermark embedding process in the embodiment.

The procedure of the digital watermark embedding process of the present embodiment is explained referring to FIG. 7. In the procedure of FIG. 7, the step S6 of FIG. 2 is followed by step S36 of "generating $f(I_D)$ by subjecting $I_D$ to signal processing". Step S7 is changed to step S37 of "generating the pattern $Wp = WM - f(I_D)2$ to be overlapped on the frame $I_{f-1}$ and the pattern $Wn = f(I_D)2 - WM$ to be overlapped on the frame $I_f$".

The procedure of FIG. 7 uses a procedure of (21-1) to (23-2), but may use a procedure of (31-1) to (33-2). In this case, in the procedure of FIG. 7 step S37 has to be changed into a process of "overlapping $-f(I_D)/2$ on the frame $I_{f-1}$, and $f(I_D)/2$ on the frame $I_f$", and step S8 has to be changed into a process of "overlapping WM on the frame $I_{f-1}$ and −WM on the frame $I_f$".

The signal processing f(x) may be performed using, for example, a two-dimensional low-pass filter or using a high pass filter or a three-dimensional filter. The high pass filter influences a picture quality but makes it possible to remove influence of image (noise) effectively. When a low pass filter is used, a picture quality is given priority over a detection rate. The detection rate can be raised by using effective filter according to the image.

The configuration of the digital watermark detection apparatus of the present embodiment may be basically similar to that of FIG. 4. The procedure of the digital watermark detection process in the present embodiment may be basically similar to hat of FIG. 5.

There will be explained a variation of the digital watermark detection.

In the above explanation, $DWM = I_D - f(I_D) + 2WM$ or $DWM = (I_1' - I_2')/2 = (I_1 - I_2 - f(I_D) + 2WM)/2 = (I_D - f(I_D))/2 + WM$ are obtained as a detection watermark pattern by the digital watermark detection of the present embodiment.

There is considered an example of subjecting the detection result to signal processing (for example, filtering with a low pass filter) g(x) further.

When g(x) is subjected to $I_D - f(I_D) + 2WM$, a detected pattern is $DWM = g(I_D) - g(f(I_D)) + 2g(WM)$.

When $g(I_D) - g(f(I_D)) << I_D - f(I_D)$ and $g(WM) \div WM$, it becomes possible to detect the watermark more precisely. This provides a very large effect for watermark detection.

In this time, the filter is not limited to a low pass filter, and any filter may be used. A higher detection rate can be provided by selecting filter according to a filter(for example, high pass filter or median filter) that is selected at the time of watermark embedding.

Figure 8:
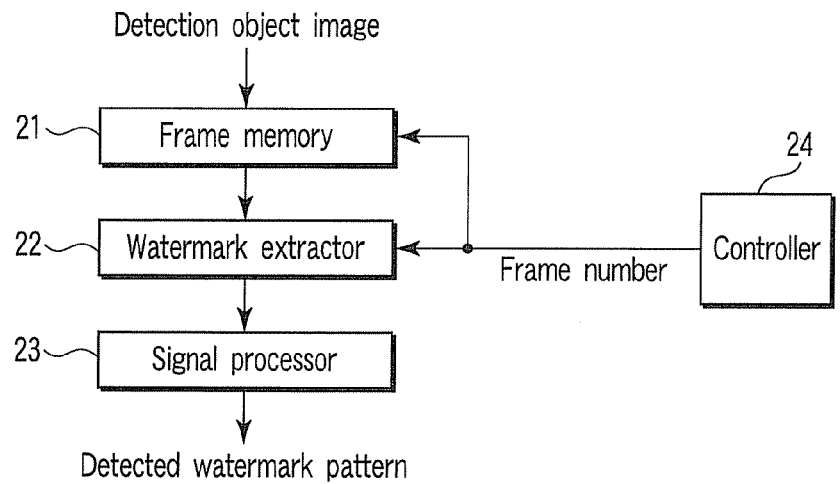
FIG. 8 is a schematic block diagram of another digital watermark detection apparatus concerning the embodiment.

According to the digital watermark detection apparatus of FIG. 8, a signal processor 23 for performing signal processing (for example, filtering with a low pass filter) is added to the embodiment of FIG. 4.

Figure 9:
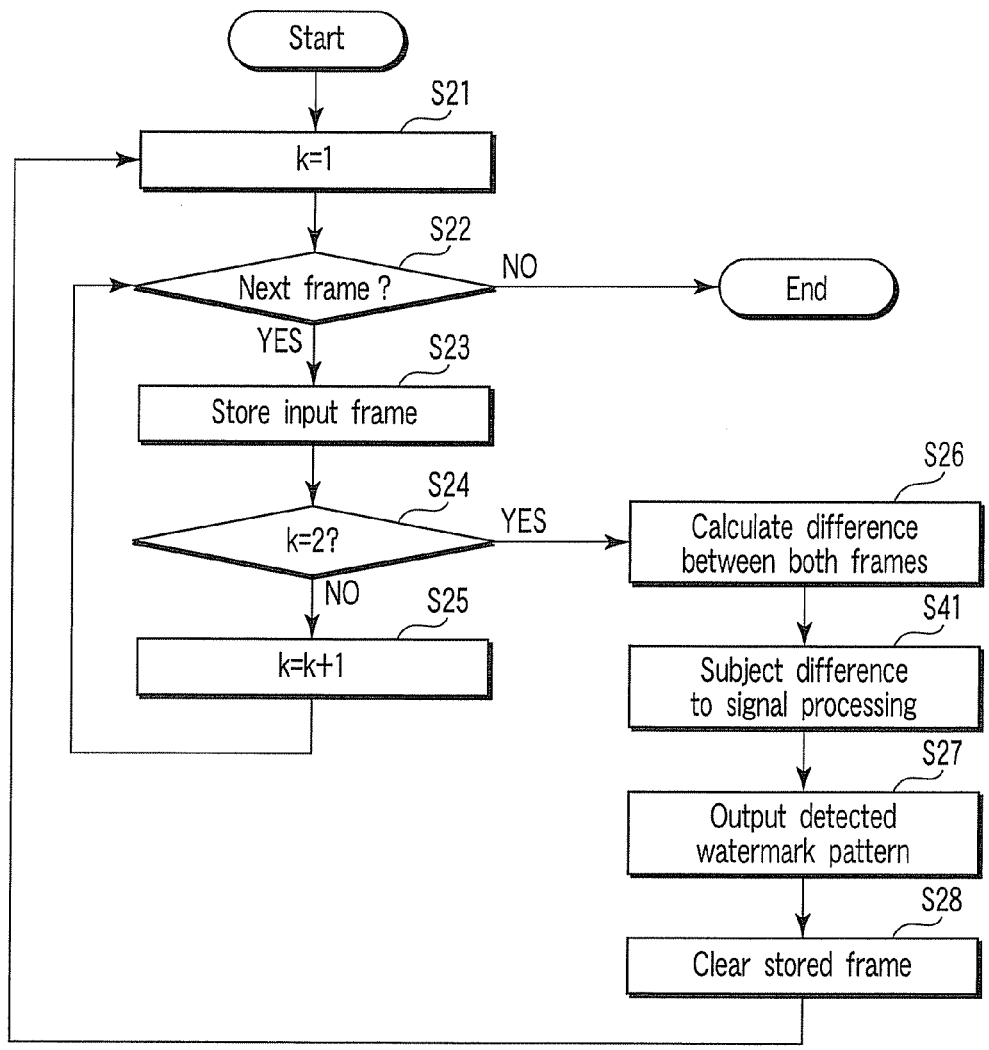
FIG. 9 is a flow chart indicating a procedure of another digital watermark detection process in the embodiment.

A procedure of the digital watermark detection process is explained referring to FIG. 9. In a procedure of FIG. 9, step S41 additionally follows the step S26 of FIG. 2. Step S41 is a step of "performing signal processing on a difference between the frame $I_f$ of the frame number f and the frame $I_{f-1}$ of the frame number f−1 (or a value obtained by multiplying the difference by ½) in the signal processor 23".

THIRD EMBODIMENT

The first and second embodiments provide a method and apparatus for embedding a single watermark pattern in a set of two frames, but the third embodiment provides a method and apparatus for embedding a single watermark pattern in two or more frames.

In the present embodiment, the watermark pattern WM is overlapped on n frames $I_1$ to $I_n$ among $2_{n+1}$ frames, and a reversed pattern (–WM) of the watermark pattern WM is overlapped on n frames $I_{n+2}$ to $I_{2n+1}$.

The watermark detection of the embodiment detects a difference between an average image of first n frames and an average image of next n frames. In this case like the first and second embodiments, an error may occur in some feature quantity of image at the time of watermark detection and make it impossible to detect the watermark in accuracy. For this reason, the difference between the average image of the first n frames and the average image of next n frames is calculated beforehand, and the watermark is overlapped on the frames so that the difference is offset at the time of watermark detection.

A different point between the first and second embodiments is explained hereinafter.

The configuration of the digital watermark embedding apparatus concerning the present embodiment may be basically similar to FIG. 1 (when f is used) or FIG. 6 (when $f(I_D)$ is used). A case of FIG. 6 is explained hereinafter.

Figure 10:
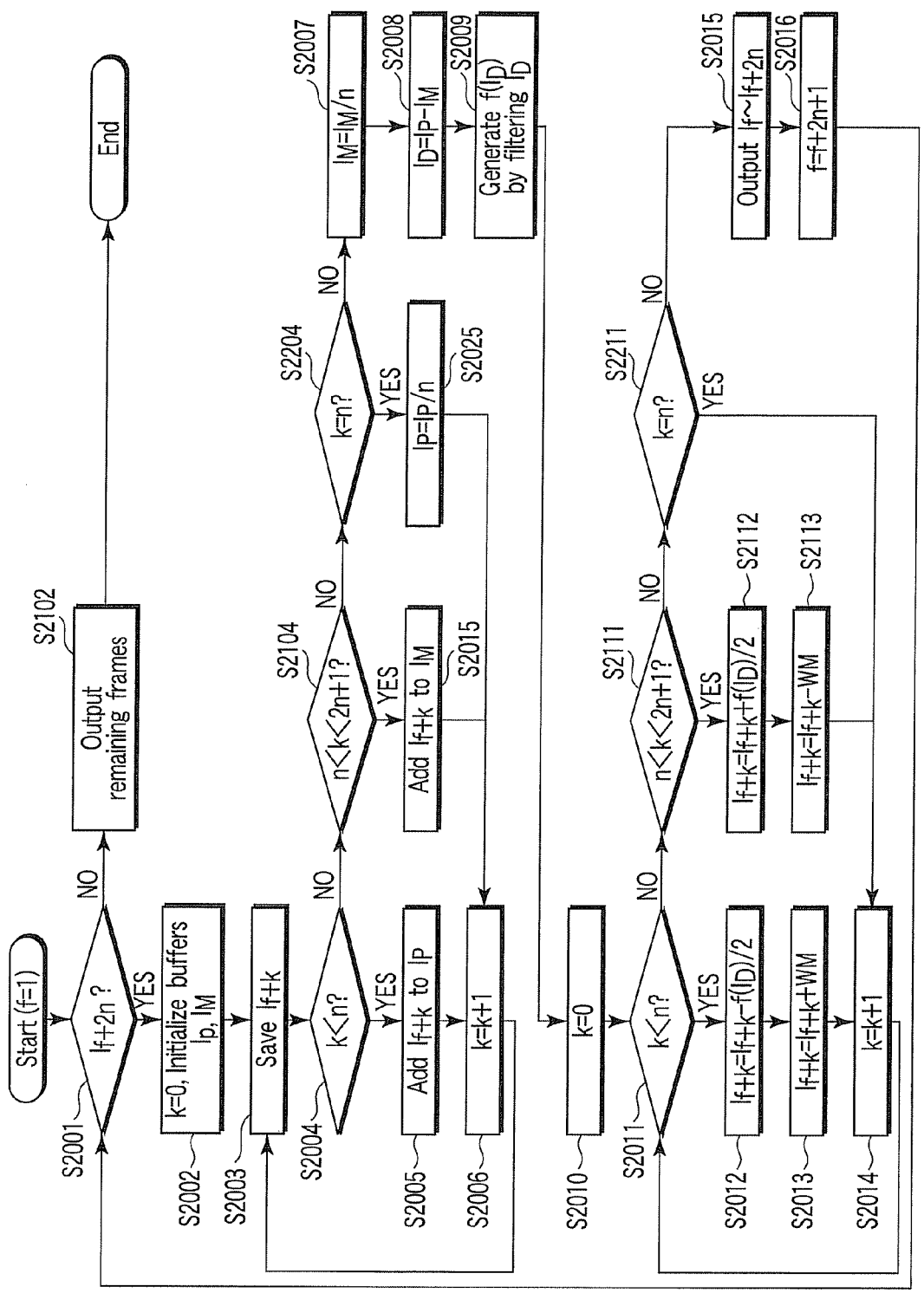
FIG. 10 is a flow chart indicating a procedure of another digital watermark embedding processes in the embodiment.

In the procedure of the digital watermark embedding process shown in FIG. 10, all frames of a target moving image are to be subjected to watermark embedding. However, if the number of frames is not a multiple of (2n+1), the frames corresponding in number to a surplus obtained by dividing the number of frames by (2n+1) are unprocessed. This procedure uses the procedure of (31-1) to (33-2) of the second embodiment.

There are various kinds of variation for designation of n. For example, the same n frames may be always used, or the n frames may be externally designated.

In FIG. 10, the process is started by setting an initial value of the frame number at 1 (f=1) and repeated as follows till step S2001 determines NO.

At first, it is confirmed whether there is a frame $I_{f+2n}$ at two frames before the frame $I_f$ (step S2001). If there is not the frame $I_{f+2n}$, all of the remaining frames are output as-is (step S2102), and this process is finished.

If there is the frame $I_{f+2n}$ in step S2001, the process advances to step S2002. In step S2002, the parameter k is initialized to 0, and buffers $I_p$ and $I_M$ are initialized.

The frame $I_{f+k}$ is saved in the frame memory 11 (step S2003). k<n is determined (step S2004). If k<n, $I_{f+k}$ is added to $I_p$ (step S2005). After k is incremented (step S2006), the process returns to step S2003 to repeat the same steps S2003 to S2006.

If k=n (step S2004, S2104, S2204), an average image of the first halves ($I_f$ to $I_{f+n-1}$) is generated (step S2205). k is incremented (step S2006), and the process returns to step S2003 to execute the process for the latter half.

If the process returns to step S2003, the frame $I_{f+k}$ is stored in the frame memory 11 . If n<k<2n+1 (step S2104), the frame $I_{f+k}$ is added to the frame $I_M$ (step S2015). After k is incremented (step S2006), the process returns to step S2003 to repeat the similar process.

If k=2n+1 (step S2004, S2104, S2204), an average image of the latter halves ($I_{f+n+1}$ to $I_{f+2n}$) is generated (step S2007). The difference image $I_D$ between the average image ($I_p$) of the first halves and the average image of the latter halves is generated (step S2008). The difference $I_D$ is filtered to generate the processed difference $f(I_D)$ (step S2009), and k is initialized to 0 (step S2010).

In the result of the multidrop process of steps S2011, S2111, S2211, if k is smaller than n, the process advances to step S2012. If k is n+1 to 2n, the process advances to step S2112. If k=n, the process advances to step S2014. If k is larger than 2n, the process advances to step S2015.

When the process advances to step S2012, $f(I_D)/2$ indicating a feature component of the image is subtracted from the frame $I_{f+k}$, and then the watermark pattern WM is overlapped on the frame in step S2013. k is incremented in step S2014 and then the process returns to the multidrop process step S2011.

When the process advances to step S2112, the difference $f(I_D)/2$ is added to the frame $I_{f+k}$. Thereafter, a reversed pattern –WM obtained by reversing the watermark pattern WM in polarity is overlapped on the frame in step S2113. k is incremented in step S2014, and the process returns to the multidrop process step S2011. When the process advances to step S2014, k is incremented in step S2014, and then the process returns to the multidrop process step S2011.

When the process advances to step S2015, it is assumed that the process of the frames $I_f$ to $I_{f+2n}$ is completed, and the frames $I_f$ to $I_{f+2n}$ are output. After the frame 2n+1 is added to the frame f in step S2016, the process returns to step S2001 to repeat the similar process.

In this way, it becomes possible to detect a watermark in accuracy while the same watermark pattern is embedded in plural frames. The watermark is not embedded in the $I_{f+n}$ frame in the above example. Even if there is a frame not embedded with a watermark on the way, the effectiveness does not change.

The above procedure uses a procedure of (31-1) to (33-2) of the second embodiment. However, it can use various variation such as the procedure of (1) to (3-2) of the first embodiment, the procedure of (11) to (13-2) of the first embodiment, the procedure of (21-1) to (23-2) of the second embodiment.

The configuration of the above digital watermark detection apparatus may be basically similar to FIG. 4. The procedure of the digital watermark detection process may be basically similar to FIG. 5. Alternatively, the configuration of the digital watermark detection apparatus may be basically similar to FIG. 8. The procedure of the digital watermark detection process may be basically similar to FIG. 9. In both cases, step S24 has only to be changed to the contents for determining whether "k=2n+1", and step S26 has only to be changed to the process of generating "an average image of the first halves ($I_f$ to $I_{f+n-1}$) and an average image of the latter halves ($I_{f+n+1}$ to $I_{f+2n}$) and calculating a difference between these average images". Even if the image lacks, the average image has only to use only an existing frame.

FOURTH EMBODIMENT

The first to third embodiments use a difference between two images (frame images or average images) basically. The fourth embodiment uses the number of frames over that of first to third embodiments.

There is explained a point different from the first to third embodiments hereinafter.

There is considered a case that the frames $I_1$ to $I_3$ of successive frames $I_1$ to $I_6$ are embedded with the watermark pattern $I_{WM}$ in positive direction, and the frames $I_4$ to $I_6$ are embedded with the watermark $I_{WM}$ in a negative direction (the successive frames $I_1$ to $I_6$ are considered, but the frames $I_1$ and $I_6$ are not used here).

When the watermark embedded image is assumed to be $I_f''$ (f indicates the frame number), the following equation is established.

$I_1''=I_1+I_{WM}$ $I_2''=I_2+I_{WM}$ $I_3''=I_3+I_{WM}$ $$I_4'' = I_4 + (-I_{WM})$$

$$I_5'' = I_5 + (-I_{WM})$$

$$I_6'' = I_6 + (-I_{WM})$$

In this time, it is thought to detect $I_{WM0}$ using the frames $I_2''$ to $I_5''$.

When the watermark is assumed to be detected by $I_{WM0} = -I_2''/2 + 3I_3''/2 - 3I_4''/2 + I_5''/2$, the result is $I_{WM0} = -I_2/2 + 3I_3/2 - 3I_4/2 + I_5/2 + 2I_{WM} = I_R + 2I_{WM}$, where $I_R = -I_2/2 + 3I_3/2 - 3I_4/2 + I_5/2$ As shown in FIG. 11, "$-I_2/2 + 3I_3/2$" of $IR = -I_2/2 + 3I_3/2 - 3I_4/2 + I_5/2 = (-I_2/2 + 3I_3/2) - (3I_4/2 - I_5/2)$ is a point where the images $I_2$ and $I_3$ are divided externally at 3:1. This corresponds to predicting the 3.5-th frame (I3.5). "$3I_4/2 - I_5/2$" is a point where the images $I_4$ and $I_5$ are divided externally at 1:3, and corresponds to predicting the 3.5-th frame at the same time. In the present embodiment, the watermark pattern is detected by calculating a difference between these two predictive images.

When the difference $I_R$ is compared with a watermark signal, if $I_R$ is a very small signal component, the watermark can be detected in accuracy. However, if $I_R$ is a large signal component, it adversely affects watermark detection. In the present embodiment, a component adversely affecting watermark detection is extracted at the time of watermark embedding is extracted beforehand, and a reversed component of the extracted component is overlapped on the image. As a result, the watermark pattern can be detected more precisely.

Assuming that the signal component adversely effecting the watermark detection is $I_D$, when an embedding pattern whose watermark pattern is modified using $I_D$ as follows is overlapped on each image, the watermark pattern can be detected more precisely.

$$I_D = -I_2/2 + 3I_3/2 - 3I_4/2 + I_5/2 = I_R$$

$$I_2' = I_2 + (I_{WM} + I_D/4)$$

$$I_3' = I_3 + (I_{WM} - I_D/4)$$

$$I_4' = I_4 + (-1)(I_{WM} - I_D/4)$$

$$I_5' = I_5 + (-1)(I_{WM} + I_D/4)$$

The detection watermark pattern $I_{WM0}$ is generated as follows.

$$I_{WM0} = -I_2'/2 + 3I_3'/2 - 3I_4'/2 + I_5'/2$$

$$= -1/2(I_2 + I_D/4 + I_{WM}) + 3/2(I_3 - I_D/4 + I_{WM}) - 3/2(I_4 + I_D/4 - I_{WM}) + 1/2(I_5 - I_D/4 - I_{WM})$$

$$= -I_2/2 + 3I_3/2 - 3I_4/2 + I_5/2 - (1/2 + 3/2 + 3/2 + 1/2)I_D/4 + (1/2 + 3/2 + 1/2)I_{WM}$$

$$= I_D - I_D + 2I_{WM}$$

$$= 2I_{WM}$$

When the difference $I_D$ has an influence on picture quality, the difference $I_D$ is subjected to filtering in two-dimension using a low-pass filter, etc., to obtain the difference $f(I_D)$ like the second and third embodiments. The following frames may be used instead of frames $I_2'$-$I_5'$.

$$I_2' = I_2 + (I_{WM} + f(I_D))/4)$$

$$I_3' = I_3 + (I_{WM} - f(I_D))/4)$$

$$I_4' = I_4 + (-1)(I_{WM} - f(I_D))/4)$$

$$I_5' = I_5 + (-1)(I_{WM} + f(I_D))/4)$$

In this case, the detected digital watermark signal becomes $I_{WM0} = I_{D-f(ID)} + 2I_{WM}$. As a result, a watermark embedding system of higher detection accuracy can be realized by embedding simply the watermark while suppressing degradation of picture quality.

If the result of the above process is filtered by the filter $f(x)$ of two-dimension, a further high detection rate can be obtained. In other words, $f(I_{Wool}) = f(ID) - f(I_D) + 2I_{WM}) = f(I_D) - f(f(I_D)) + 2f(I_{WM})$ is established. If a filter represented by $f(I_D) \div f(ID)$ and $I_{WM} \div f(I_{WM})$ is used, an effect is enhanced.

In the watermark detection process, if the watermark is not detected only from a part corresponding to the frames $I_2'$-$I_5'$, but detected from the circumference thereof, a detection method capable of enhancing detection precision can be provided.

The watermark detected by a method similar to the previously described $I_{WM0}$ using the frames $I_1'$ to $I_4'$ is assumed to be $I_{WM-1}$, and the watermark detected by the same method using the frames $I_3'$ to $I_6'$ is assumed to be $I_{WM1}$ (there is a mode using $I_D$ and a mode using $f(I_D)$ as described before).

The watermark detection method using $I_{WM-1}$ to $I_{WM1}$ is described as follows.

When $I_{WM-1}$ and $I_{WM1}$ are calculated similarly to $I_{WM0}$, the following watermarks are obtained.

$$I_{WM-1} = -I_1'/2 + 3I_2'/2 - 3I_3'/2 + I_4'/2$$

$$I_{WM0} = -I_2'/2 + 3I_3'/2 - 3I_4'/2 + I_5'/2 \ (=2I_{WM})$$

$$I_{WM1} = -I_3'/2 + 3I_4'/2 - 3I_5'/2 + I_6'/2$$

where $I_1' = I_{1+IWM}$ and $I_6' = I_6 + (-I_{WM})$.

There are a detection method using $f(I_D)$ and a detection method using $f(I_D)$ about $I_2'$ to $I_5'$ as described above. The former case is described hereinafter.

Assuming that these frames are subjected to filtering with one-dimensional time direction filter of $I_{WM-1} : I_{WM0} : I_{WM1} = -1 : 2 : -1$, and the result of the filtering is $I_{DWM}$, $I_{DWM}$ is obtained as follows.

$$\begin{aligned}I_{DWM} &= -I_{WM-1} + 2I_{WM0} - I_{WM1} = -(-I_1'/2 + 3I_2'/2 - I_3'/2 + I_4'/2) + \\ &\quad 2(-I_2'/2 + 3I_3'/2 - 3I_4'/2 + I_5'/2) - \\ &\quad (-I_3'/2 + 3I_4'/2 - 3I_5'/2 + I_6'/2) = \\ &\quad I_1'/2 - 5I_2'/2 + 5I_3' - 5I_4' + 5I_5'/2 - I_6'/2 = \\ &\quad 1/2(I_1 + I_{WM}) - 5/2(I_2 + I_D/4 + IWM) + 5(I_3 - I_D/4 + I_{WM}) - \\ &\quad 5(I_4 + I_D/4 - I_{WM}) + 5/2(I_5 - I_D/4 - I_{WM}) - 1/2(I_6 - I_{WM}) = \\ &\quad I_1/2 - 5I_2/2 + 5I_3 - 5I_4 + 5I_5/2 - I_6/2 - 15I_D/4 + 6I_{WM} = \\ &\quad I_1/2 - 5I_2/2 + 5I_3 - 5I_4 + 5I_5/2 - I_6/2 - \\ &\quad 15(-I_2/2 + 3I_3/2 - 3I_4/2 + I_5/2)/4 + 6I_{WM} = \\ &\quad (I_1/2 - 5I_2/8 - 5I_3/8 + 5I_4/8 + 5I_5/8 - I_6/2) + 6I_{WM}\end{aligned}$$

The signal component of the watermark is enhanced in comparison with an independent $I_{MMO}$. When it is considered that a noise is mixed in the image due to various processing such as compression subjected to the image, it can be expected to come to be easy to detect a watermark.

If the result of the above process is filtered by the two-dimensional filter $f(x)$, a further high detection rate can be obtained.

In other words, assuming that $f(I_{DWM})$ is represented by the following equation.

$$f(I_{DWM}) = f(I_1/2 - 5I_2/8 - 5I_3/8 + 5I_4/8 + 5I_5/8 - I_6/2 + 6I_{WM}) =$$
$$f(I_1)/2 - 5/8f(I_2) - 5/8f(I_3) + 5/8f(I_4) + 5/8f(I_5) - f(I_6)/2 +$$
$$f(6I_{WM})I_1/2 - 5I_2/8 - 5I_3/8 + 5I_4/8 + 5I_5/8 - I_6/2 = I_N.$$

If a filter of $f(I_N) \ll I_N$ and $I_{WM} \div f(I_{WM})$ is used, a large effect is obtained. In many cases, when a low pass filter is used, detection accuracy is enhanced. However, a high path filter or bandpass filter may be used according to shape of the image or the watermark.

The configuration of the digital watermark embedding apparatus concerning the present embodiment may be basically similar to FIG. 1 (when f is used) or FIG. 6 (when $f(I_D)$ is used). There will now be described the example of FIG. 6.

Figure 12:
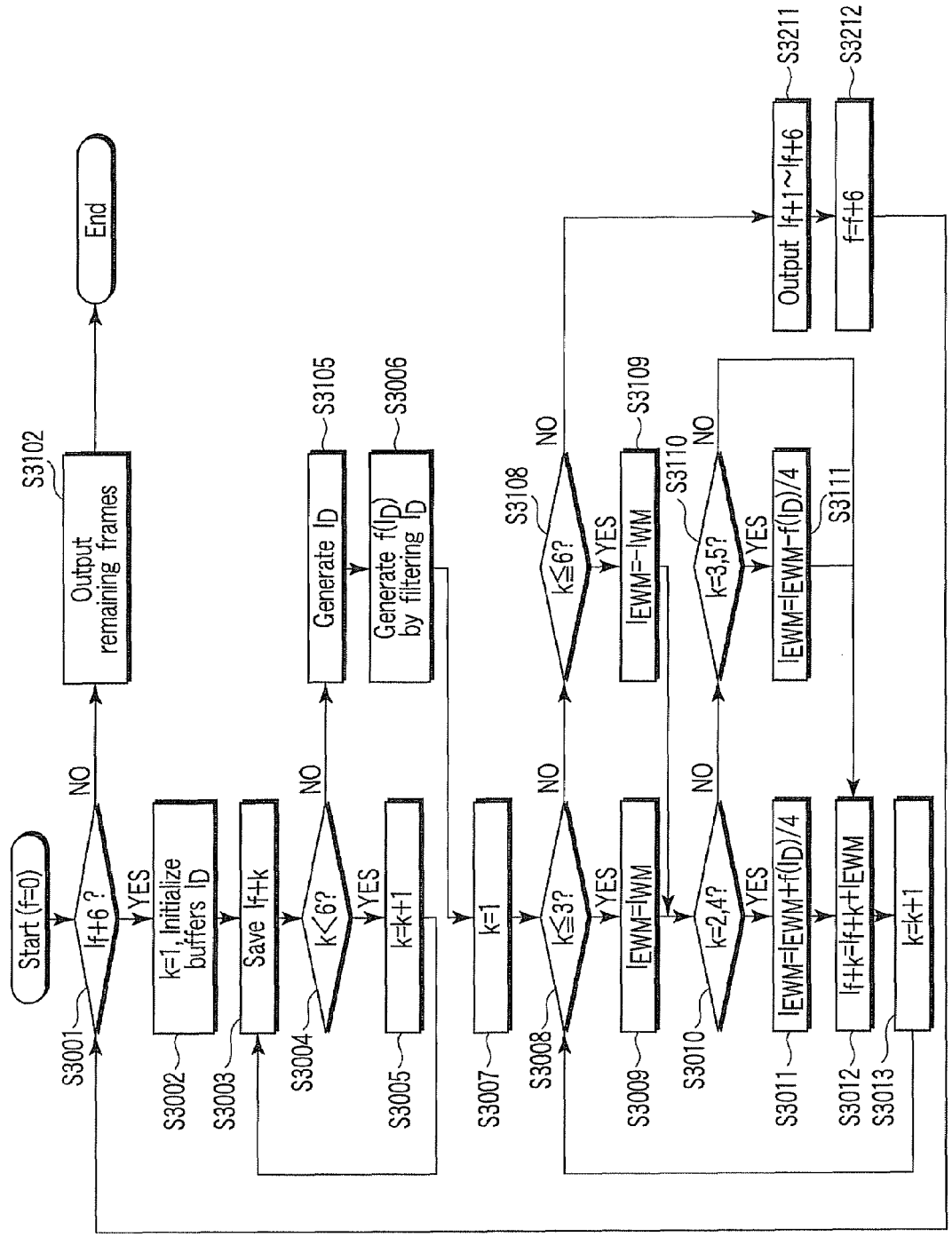
FIG. 12 is a flow chart indicating a procedure of another digital watermark embedding process in the embodiment.

In the procedure of the digital watermark embedding process shown in FIG. 12, all frames of a target moving image are assumed to be subjected to watermark embedding. However, if the number of frames is not a multiple of 6, the frames corresponding in number to a surplus obtained by dividing the number of frames by 6 are unprocessed.

The process is started for f=0, and repeated as follows till step S3001 determines NO.

It is confirmed whether there are watermark embedding frames for six frames on and after the present (step S3001). If there is not the frame $I_{f+6}$, all of remaining frames are output as-is (step S3102), and this process is finished. I$_f$ there is the frame If+6 in step S3001, the process advances to step S3002. In step S3002, the parameter k=1 is set and the buffer $I_D$ is initialized.

The (f+k)-th numbered frame $I_{f+k}$ is stored in the frame memory 11 (step S3003). If k<6, 1 is added to k (step S3004, S3005), and the process returns to step S3003. If the process of steps S3003 to S3005 is repeated and k reaches 6, "k<6" in step S3004 is false. In this time, the process advances to step S3015 wherein $I_D = -I_{f+2}/2 + 3I_{f+3}/2 - 3I_{f+4}/2 + I_{f+5}/2$ is calculated.

A given filtering process is subjected to the difference $I_D$ by the signal processor 13 to generate a difference $f(I_D)$. If the difference $f(I_D)$ is generated, k=1 is set (step S3007).

In the embedding pattern generator 14, if k is any one of 1-3, the positive watermark pattern $I_{WM}$ is set as $I_{EWM}$. If k is any one of 4-6, the negative watermark pattern $(-I_{WM})$ is set as $I_{EWM}$ (step S3008, S3009, S3108, S3109). In the embedding pattern generator 14, if k is 2 or 4, $f(I_D)/4$ is added to $I_{EWM}$. If k is 3 or 5, $f(I_D)/4$ is subtracted from $I_{EWM}$ (step S3010, S3011, S3110, S3111). If k is 1 or 6, neither addition nor subtraction does.

The pattern $I_{EWM}$ generated by the embedding pattern generator 14 is overlapped on the frame $I_{f+k}$ by the watermark overlapping unit 15, whereby watermark embedding is done (step S3012). k=k+1 is set in order to process a next frame (step S3013), the process returns to step S3008. When k in step S3013 exceeds 6, the process advances to step S3211 through steps S3008 and S3108. In the step S3211, it is determined that the watermark embedding process for one period has been completed and frames $I_{f+1}$ to $I_{f+6}$ are outputs. 6 is added to f in step S3212, and the process advances to step S3001.

Figure 13:
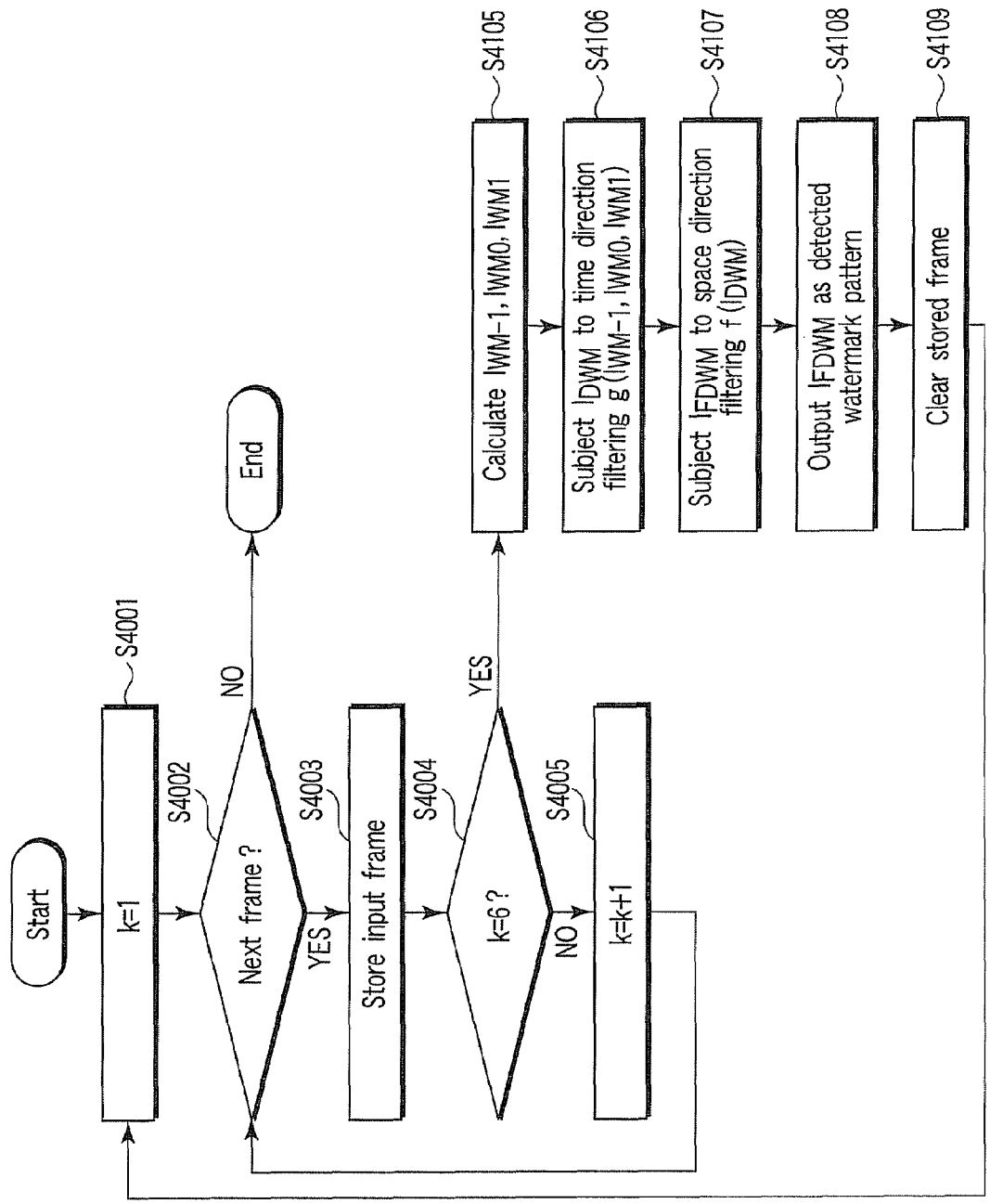
FIG. 13 is a flow chart indicating a procedure of another digital watermark detection process in the embodiment.

The configuration for the digital watermark embedding detection concerning the present embodiment may be basically similar to FIG. 4 or FIG. 8. Using the configuration of FIG. 8 hereinafter, the procedure of digital watermark detection process of the present embodiment is described according to flowchart of FIG. 13. In this procedure, all frames of a target moving image are assumed to be subjected to watermark embedding. However, if the number of frames is not a multiple of 6, the frames corresponding in number to a surplus obtained by dividing the number of frames by 6 are unprocessed. In FIG. 13, designation of the frame number is omitted.

The following process is repeated till NO is determined in step S4002.

k=1 is set (step S4001), and it is confirmed whether there is a next frame (a top frame of frames which are not input or stored yet) (step S4002). When there is the next frame, the next frame is input and saved to the frame memory 21 (step S4003).

If "k=6" is false, 1 is added to k (step S4004, S4005), and the process returns to step S4002. I$_f$ the process of steps S4002-S4005 is repeated and k reaches 6, "k=6" in step S3004 is truth. In this time, the process advances to step 4105, in which $I_{WM-1}$, $I_{WM0}$, $I_{WM1}$ are extracted by the watermark extractor 22 according to the following equations.

$$I_{WM-1} = -I_1/2 + 3I_2/2 - 3I_3/2 + I_4/2$$

$$I_{WM0} = -I_2/2 + 3I_3/2 - 3I_4/2 + I_5/2$$

$$I_{WM1} = -I_3/2 + 3I_4/2 - 3I_5/2 + I_6/2$$

In the signal processor 23, $I_{DWM} = g(I_{WM-1}, I_{WM0}, I_{WM1})$ is calculated from $I_{WM-1}$, $I_{WM0}$, $I_{WM1}$ using a time directional filter g(x) (step S4106).

Further, the obtained $I_{DWM}$ is subjected to filtering with a space directional filter f(x) to generate $I_{fDWM} = f(I_{DWM})$ (step S4107). The generated $I_{fDWM}$ is output as a detected watermark pattern (step S4108). The frames stored till now are cleared (step S4109), and then the process returns to step S4001 to repeat the process. I$_f$ there is not the next frame in S4002, this process is finished.

FIFTH EMBODIMENT

The fifth embodiment is explained mainly on a point different from the above embodiments. This embodiment is explained using the frame as image data similarly to the above.

In the present embodiment, as for watermark embedding, each frame of video contents to be embedded with a watermark is classified into a plurality of groups according to a given classification method, and each group is subjected to, for example, the digital watermark embedding process described above. As for detection of digital watermark, each frame of video contents to be detected is classified into a plurality of groups (by the same method as the digital watermark embedding), and each group is subjected to the digital watermark detection process (corresponding to the digital watermark embedding process carried out for the group) described above.

When each frame of video contents to be embedded with a watermark pattern is classified into a plurality of groups, all of the groups may be embedded with watermark patterns or some of the groups may be embedded with watermark patterns. When each frame of video contents to be subjected to watermark detection is classified into a plurality of groups, all of the groups may be subjected to watermark detection or some of the groups may be subjected to watermark detection.

There are various kinds of variations in the classification method. There is a method of classifying the frame based on the frame number f, for example. There is a method of classifying the frame by surplus r(=f mod n) obtained when the frame number f is divided by a predetermined integer n. According to this method, the frames are grouped into a group of surplus r=0 (a group of even numbered frames) and a group of surplus r=1 (a group of odd numbered frames) in the case of n=2. The value of n may set appropriately.

There are considered various methods according to the feature of the motion image or processing manner, for example, a method of classifying the frames based on a scene belonging to the frame (for example, a method of detecting a scene change and grouping all frames belonging to the same scene into one group), a method of classifying the frames based on a picture type (I, P, B picture) of the frame in a MPEG image (a method of classifying the frames into two groups according to, for example, I and P picture and B picture), a method of classifying the frames based on a feature quantity of frame (for example, an average luminance) (a method of calculating, for example, an average luminance every frame, and classifying the frames by a high-low level of average luminance (the level may be set to several phases)), and a combination of the above methods.

A digital watermark embedding process carried out every group and contents of a digital watermark detection process can be set independently every group. On that occasion, the same watermark pattern may be embedded in all groups, or a different watermark pattern may be embedded in one or more the groups according to the group. In the latter case, some of the groups may be embedded with the same watermark pattern).

The same watermark embedding method/watermark detection method may be used for all groups or a different watermark embedding method/watermark detection method may be used according to the group (in the case of the latter case, the same watermark embedding method/detection method may be used for some groups).

The watermark embedding method/detection method may use the methods explained in the previous embodiments appropriately. Some of groups can use a conventional watermark embedding method/detection method.

When the same watermark embedding method/detection method are used for two groups, for example, the watermark embedding method/detection method of any one of the first to fourth embodiments are used for the two groups. When a different watermark embedding method/detection method are used for two groups, the watermark embedding method/detection method of one of the first to fourth embodiments are used for the first group, and the other watermark embedding method/detection method may be used for the second group.

In the case that, in each group, the number of frames belonging to the group is I, and the number of frames used for embedding a watermark pattern by the watermark embedding method used for the group is J, when I/J is not less than 2, the watermark pattern can be embedded in the group multiple times. In this time, the number of times by which the watermark pattern is embedded in the group and which frame is embedded with the watermark can be set appropriately. When the watermark pattern is embedded in one group multiple times, it is possible to embed a plurality kind of watermark patterns in the group one time or multiple times instead of embedding one kind of watermark pattern in the group multiple times.

When the same watermark pattern is embedded in the same group multiple times, it is possible to detect only some of the watermark patterns. When the same watermark pattern is embedded in a plurality of groups, it is possible to detect the watermark pattern from only some groups (it is needless to detect the watermark pattern from the remaining groups).

The various kinds of variations other than the above are available.

As described above, each frame of video contents is classed in a plurality of groups, and the digital watermark embedding process and digital watermark detection process are subjected to each group. As a result, the present embodiment can provide various effects such as detecting the watermark pattern, realizing reduction of a detection cost or embedding a plurality of kinds of watermark without losing the detection rate even when the frame is skipped.

In a specific example, the frame of video contents to be embedded with a watermark is classified in two groups, that is, a group of even numbered frames and a group of odd numbered frames according to the frame number f, and the digital watermark embedding is performed on each group. In the fourth embodiment, the watermark is embedded in the successive frames in the fourth embodiment, but in this embodiment, the watermark is embedded in discrete frames.

In this embodiment, the watermark embedding process is done in units of four frames. The watermark embedded image is assumed to be the frame If (f indicates the frame number). The even numbered frames are embedded with the watermarks as follows.

$I_{2n}'' = I_{2n}$ $I_{2n+2}'' = I_{2n+2}$ $I_{2n+4}'' = I_{2n+4} + I_{WM}$ $I_{2n+6}'' = I_{2n+6} + I_{WM}$

The odd numbered frames are embedded with the watermarks as follows.

$I_{2n+1}'' = I_{2n+1} + (-I_{WM})$ $I_{2n+3}'' = I_{2n+3} + (-I_{WM})$ $I_{2n+5}'' = I_{2n+5}$ $I_{2n+7}'' = I_{2n+7}$

The component $I_{DE}$ extracted from the even-numbered frames and adversely effecting the watermark detection is assumed to be obtained as follows.

$I_{DE} = -I_{2n}/2 + 3I_{2n+2}/2 - 3I_{2n+4}/2 + I_{2n+6}/2$

The component IDO extracted from the odd-numbered frames and adversely effecting the watermark detection is assumed to be obtained as follows.

$I_{DO} = -I_{2n+1}/2 + 3I_{2n+3}/2 - 3I_{2n+5}/2 + I_{2n+7}/2$

In this time, the watermark pattern can be detected more precisely, if the four even-numbered frames are modified as follows.

$I_{2n}' = I_{2n}$ $I_{2n+2}' = I_{2n+2} - I_{DE}/3$ $I_{2n+4}' = I_{2n+4} + I_{WM} + I_{DE}/3$ $I_{2n+6}' = I_{2n+6} + I_{WM}$

Similarly, the watermark pattern can be detected more precisely, if the four odd-numbered frames are modified as follows.

$I_{2n+1}' = I_{2n+1} + (-I_{WM}) + I_{DO}/4$ $I_{2n+3}' = I_{2n+3} + (-I_{WM}) - I_{DO}/4$ $I'_{2n+5} = I_{2n+5} + I_{DO}/4$ $I'_{2n+7} = I_{2n+7} - I_{DO}/4$

In this case, the detection watermark pattern $I_{WME}$ detected from the even-numbered frame is represented as follows.

$I_{WME} = -I'_{2n}/2 + 3I'_{2n+2}/2 - 3I'_{2n+4}/2 +$
$I'_{2n+6}/2 = -I_{2n}/2 + 3I_{2n+2}/2 - I_{DE}/2 - 3I_{2n+4}/2 - 3I_{WM}/2 -$
$I_{DE}/2 + I_{2n+6}/2 + I_{WM}/2 = I_{DE} - I_{DE} - I_{WM} = -I_{WM}$

Similarly, the detection watermark pattern $I_{WMO}$ detected from the odd-numbered frame is represented as follows.

$I_{WMO} = -I'_{2n+1}/2 + 3I'_{2n+3}/2 - 3I'_{2n+5}/2 + I'_{2n+7}/2 = -I_{2n+1}/2 +$
$I_{WM}/2 - I_{DO}/8 + 3I_{2n+3}/2 - 3I_{WM}/2 - 3I_{DO}/8 - 3I_{2n+5}/2 +$
$3I_{DO}/8 + I_{2n+7}/2 - I_{DO}/8 = I_{DO} - I_{DO} - I_{WM} = -I_{WM}$

In the above embodiment, although correction coefficients differ between the odd-numbered frame and the even-numbered frame, a precise pattern can be detected with the same degree between both frames. As thus described, the coefficient of watermark pattern overlapped on each frame is not one type but has various variations.

As described above, the watermark pattern can be detected from both even-numbered frame and odd-numbered frame.

Similarly to the fourth embodiment in the above embodiment too, $f(I_{DE})$ and $f(I_{DO})$ obtained by filtering, for example, $I_{DE}$ and $I_{DO}$ in two-dimension thereof with a high pass filter can be used instead of $I_{DE}$ and $I_{DO}$.

Figure 14:
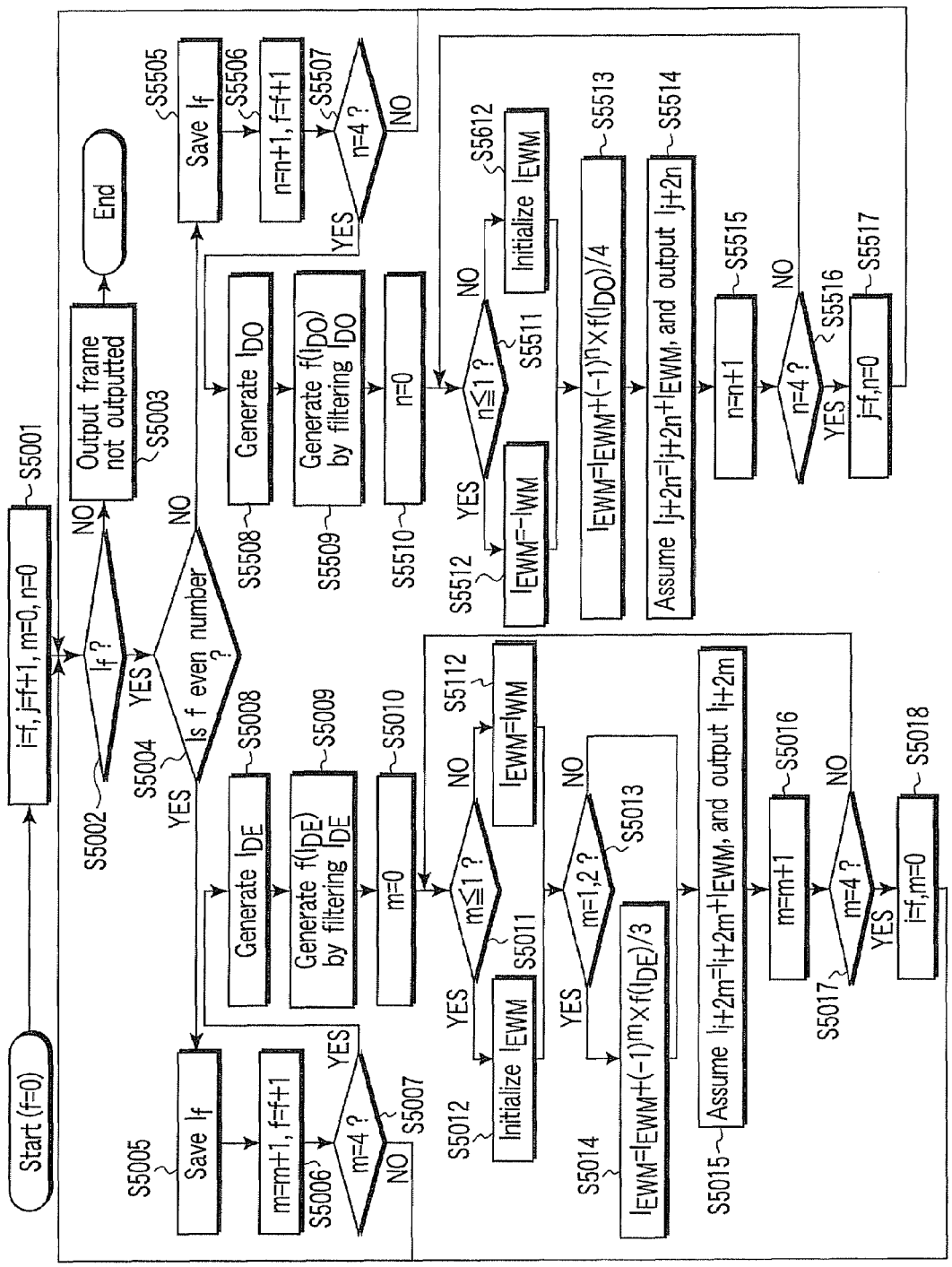
FIG. 14 is a flowchart indicating a procedure of another digital watermark detection processes in the embodiment.

In a procedure of the digital watermark embedding process of the present embodiment shown in FIG. 14, all frames of the target moving image comes to be subjected to watermark detection. However, if the number of frames is not a multiple of 8, the frames corresponding in number to a surplus obtained by dividing the number of frames by 8 are unprocessed.

A process is started for f=0. At first, as initialization work, i=f(0), j=f+1(1), m=0, n=0 are set (step S5001).

Thereafter, the following process is repeated till NO is determined in step S5002.

At first, the frame is classified. In other words, it is checked whether there is the frame If (step S5002). If the frame $I_f$ exists, the process advances to step S5004, wherein it is checked whether f is an even number or an odd number.

If f is an even number, the process advances to step S5005 to process the even-numbered frame. If f is an odd number, the process advances to step S5505 to process the odd-numbered frame.

A case that f is an even number and a case that f is an odd will be described hereinafter. The case that f is an even number will be described from step S5005.

When f is an even number, the frame If is stored in the buffer (step S5005), and 1 is added to each of m and f (step S5006). It is checked whether m=4 (step S5007). When m=4 (i.e., when four even-numbered frames f are stored in the buffer), the process advances to step S5008. Otherwise, that is, when m is less than 4, the process returns to step S5002.

In step S5008, the signal component $I_{DE}$ is generated using four stored even-numbered frames by the above-mentioned equation $(I_{DE}=-I_{2n}/2+3I_{2n+2}/2-3I_{2n+4}/2+I_{2n+6}/2)$. In step S5009, $f(I_{DE})$ is generated by filtering the component $I_{DE}$. Further, in step S5010, m is set at 0 and the process advances to step S5011.

It is checked whether m is not more than 1 or not less than 2 (step S5011). When m is not more than 1, the overlapping pattern $I_{EWM}$ is initialized not to include an embedding component (step S5012), and the process advances to step S5013. When m is not less than 2 in step S5011, the embedding pattern $I_{EWM}$ is set to the watermark pattern $I_{WM}$, and the process advances to step S5013 (step S5112).

It is checked whether m is 1 or 2 (step S5013). When m is 1, $f(I_{DE}3)$ is overlapped on the overlapping pattern $I_{WM}$ by subtraction (step S5014), and the process advances to step S5015. When m is 2, $f(I_{DE}/3)$ is overlapped on the watermark pattern $I_{WM}$ by addition (step S5014), and the process advances to step S5015. When m is other than 1 or 2, step S5014 is skipped and the process advances to step S5015. In step S5015, $I_{EWM}$ is overlapped on the frame $I_{i+2m}$ stored in the buffer and the overlapped frame $I_{i+2m}$ is output.

1 is added to m (step S5016), it is checked in step S5017 whether m is 4 (i.e., whether all of stored even-numbered frames are output). If all stored even-numbered frames are output, the process advances to step S5018. When the frame which is not yet output remains, the process advances to step S5011. In step S5018, i=f, m=0 are set, and the process returns to step S5002.

A case that f is determined to be an odd-numbered frame in step S5004 f will be explained from step S5505.

When f is an odd number, the frame If is stored in the buffer (step S5506) and 1 is added to each of n and f (step S5506). It is checked whether n=4 (step S5507). When n=4 (i.e., when four odd-numbered frames are stored in the buffer), the process advances to step S5508. Otherwise, that is, when n is less than 4, the process returns to step S5002.

In step S5508, $I_{DO}$ is generated using four stored odd-numbered frames by the above-mentioned equation $(I_{DO}=-I_{2n+1}/2+3I_{2n+3}/2-3I_{2n+5}/2+I_{2n+7}/2)$. In step S5509, the processed component $F(I_{DO})$ is generated by filtering $I_{DO}$. In step S5510, n is set at 0, and the process advances to step S5511.

It is checked whether n is not more than 1 or not less than 2 (step S5511). When n is not more than 1, the overlapping pattern $I_{EWM}$ is set at $-I_{WM}$, in other words, the pattern that a reversed pattern of the watermark pattern $I_{WM}$ is set to the pattern $I_{EWM}$ to be overlapped as a watermark (step S5512), and the process advances to step S5513. When m is not less than 2, the overlapping pattern $I_{EWM}$ is initialized not to include an embedding component (step S5612), and the process advances to step S5513.

In step S5513, when n is an even number, the component $f(I_{DO})/4$ is overlapped by addition on the pattern $I_{EWM}$ set in step S5512 or step S5612 in the event of an even number, and the process advances to step S5514. When n is an odd number, the component $f(I_{DO})/4$ is overlapped by subtraction on the pattern $I_{EWM}$ set in step S5512 or step S5612 in the event of an even number, and the process advances to step S5514. In step S5514, the pattern $I_{EWM}$ is overlapped on the frame $I_{j+2n}$ stored in the buffer and the overlapped frame $I_{j+2n}$ is output.

1 is added to n (step S5515). It is checked in step S5516 whether n is 4 (in other words whether all of stored even-numbered frames are output). If all stored even-numbered frames are output, the process advances to step S5517. When the frame which is not yet output remains, the process advances to step S5511. In step S5517, j=f, m=0 are set, and the process returns to step S5002.

The above-mentioned process is done repeatedly. If there is not $I_f$ in step S5002, the frame stored in the buffer and not yet output is output (step S5003), and this process is finished.

It became possible to detect the watermark pattern from the even-numbered frame and the odd-numbered frame independently respectively by embedding the watermark in the frame as described above. Accordingly, even if a frame rate becomes half, it is possible to detect the watermark pattern from either of the even-numbered frame and the odd-numbered frame (robust can be kept against frame rate conversion).

Even if a frame rate is not controlled at the time of watermark detection, when the watermark is assumed to be detected only from either even-numbered frame or odd-numbered frame, a time to detect a watermark per unit decreases half. The watermark may be detected from both of the even-numbered frame and odd-numbered frame to enhance detection accuracy.

In the case that a watermark wants to be detected when the frame rate decreases to ⅓, for example, the frames have only to be classified by a surplus obtained when f is divided by 3 in step S5004 rather than a classification method of the even-numbered frame and the odd-numbered frame.

In the above embodiment, the component for modifying the watermark pattern is calculated every four frames in either the even-numbered frame or the odd-numbered frame. However, every four frames are not always needed. Also, the same condition needs not keep between the even-numbered frame and the odd-numbered frame. For example, in the even-numbered frame a watermark may be embedded in every two frames and in odd-numbered frame a watermark may be embedded in every five frames. In such a way, the frames may be set arbitrarily and asymmetrically.

In the above embodiment, the same watermark pattern $I_{WM}$ is embedded in both even-numbered frame and odd-numbered frame, but different watermark patterns may be embedded in them. In this case, $I_f$ a frame rate is not converted, two kinds of watermarks can be detected.

When two kinds of watermarks want to be detected after the frame rate is converted, the frames are classified by a surplus obtained when f is divided by 4 in step S5004. In step S5004, the frames are classified on the basis of f, but the classification needs not to be always depended upon f. The frames may be classified by another classification method such as a classification method based on the feature quantity of image, for example.

The above functions can be realized by being described as software and processing it by a computer having a suitable mechanism.

The present embodiments can realize as a program for making a computer execute a given procedure or making a computer function as a given measure or making a computer realize a given function.

It can be realized as a computer readable recording medium recording the program.

According to the present invention, it is possible to improve detection accuracy of digital watermark more while suppressing degradation of picture quality.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A digital watermark embedding apparatus for embedding an image patterns as a digital watermark in each of a plurality of frames of video contents, comprising:
   a watermark providing unit configured to provide a digital watermark;
   an obtaining unit configured to obtain an image component from a plurality of frames of video contents based on image data of the plurality of frames, the image component affecting an error occurring at a time of detecting an image pattern of the digital watermark;
   a generating unit configured to generate a first image pattern and a second image pattern in converse relation, using the image pattern of the digital watermark and the image component; and
   an overlapping unit configured to overlap the first image pattern and the second image pattern the frames on the frames, respectively, to eliminate or reduce the image component.

2. The apparatus according to claim 1, wherein the generating unit generates an image pattern to be embedded in one frame of the frames by overlapping the first image pattern and the second image pattern, and the overlapping means overlaps the image pattern on the one frame.

3. A digital watermark embedding apparatus according to claim 1, wherein the overlapping unit overlaps the first image pattern and the second image pattern on the one frame separately.

4. The digital watermark embedding apparatus according to claim 1, which further comprises a signal processing unit configured to perform signal processing on the image component, and wherein the generating unit generates the second image pattern to be embedded in each of the plurality of frames, based on the signal-processed image component.

5. The apparatus according to claim 4, wherein the signal processing unit includes a two-dimensional filter in two-dimension.

6. The apparatus according to claim 1, wherein the plurality of frames are two frames,
   the image component is formed of a difference image indicating a difference between the image data of two frames,
   the first image pattern corresponding to one frame of the two frames is formed of a same pattern as the image pattern of the digital watermark,
   the second image pattern is formed of a pattern obtained by reversing the difference image or an image formed by signal-processing the difference image and multiplying a inversed image by 2,
   the first image pattern corresponding to other of the two frames is formed of a pattern obtained by reversing the digital watermark image pattern, and
   the second image pattern is formed of a pattern obtained by dividing the difference image or an image formed by signal-processing the difference image by 2.

7. The apparatus according to claim 1, wherein the plurality of frames are 2n frames,
   the image component includes a difference image indicating a difference between a first average image derived from image data of n frames of the 2n frames and a second average image derived from remaining n frames of the 2n frames,
   the first image pattern corresponding to each of the n frames is a same pattern as the image pattern of the digital watermark, the second image pattern is formed of a pattern obtained by reversing the difference image or an image formed by signal-processing the difference image and dividing an inversed image by 2, the first image pattern corresponding to each of remaining n frames of the 2n frames is formed of a pattern obtained by reversing the digital watermark image pattern, and the second image pattern is formed of a pattern obtained by dividing the difference image or an image formed by signal-processing the difference image by 2.

8. The apparatus according to claim 1, wherein the plurality of frames are four frames, the image component includes a predictive difference image obtained by overlapping images generated by multiplying image data of the four frames by specific factors respectively, the first image pattern corresponding to the first frame of the four frames is a same pattern as the image pattern of the digital watermark, the second image pattern is formed of the predictive difference image or an image formed by signal-processing the predictive difference image and dividing a signal processed image by 4, the first image pattern corresponding to the second frame is formed of a same pattern as the image pattern of the digital watermark, the second image pattern is formed of the predictive difference image or an image obtained by signal-processing the predictive difference image, reversing a signal processed image and dividing a reversed image by 4, the first image pattern corresponding to the third frame is formed of a pattern generated by reversing the image pattern of the digital watermark, the second image pattern is formed of a pattern obtained by dividing the predictive difference image or an image formed by signal-processing the predictive difference image by 4, the first image pattern corresponding to the fourth frame is formed of a pattern obtained by reversing the image pattern of the digital watermark, the second image pattern is formed of the predictive difference image or an image obtained by signal-processing the predictive difference image and dividing a signal processed image by 4.

9. The apparatus according to claim 1, which further comprises a classifying unit configured to class frames of video contents according to a predetermined classification mode in a plurality of groups, and wherein the obtaining unit includes a calculation unit configured to calculate the image component independently every classified group, to determine the first image pattern and the second image pattern.

10. The apparatus according to claim 9, wherein the classification mode includes one of a mode of classifying the frames according to number of frame, a mode of classifying the frames according to a scene belonging to the frame, a mode of classifying the frames according to a type of picture of the frame and a mode of classifying feature quantity of the frame.

11. A digital watermark embedding method for embedding an image pattern as a digital watermark using a plurality of frames of video contents, comprising using a computer to perform the following acts:

acquiring an image component from a plurality of frames of video contents based on image data of the plurality of frames, the image component affecting an error occurring at a time of detecting an image pattern of the digital watermark;

generating a first image pattern and a second image pattern in converse relation, using the image pattern of the digital watermark and the image component; and overlapping the first image pattern and the second image pattern the frames on the frames, respectively, to eliminate or reduce the image component.

12. A computer readable medium storing a digital watermark embedding program for causing a computer to embed an image pattern as a digital watermark suing a plurality of frames of video contents, the program comprising:

means for instructing a computer to acquire an image component from a plurality of frames of video contents based on image data of the plurality of frames, the image component affecting an error occurring at a time of detecting an image pattern of the digital watermark;

means for instructing the computer to determine a first image pattern to be embedded in each of the plurality of frames, based on an image pattern of a digital watermark;

means for instructing the computer to generate a first image pattern and a second image pattern in converse relation, using the image pattern of the digital watermark and the image component; and means for instructing the computer to the first image pattern and the second image pattern the frames on the frames, respectively, to eliminate or reduce the image component.

* * * * *